US007028561B2

United States Patent
Robertson et al.

(10) Patent No.: US 7,028,561 B2
(45) Date of Patent: *Apr. 18, 2006

(54) FUEL DISPENSER FUEL METER ERROR DETECTION DEVICE, SYSTEM AND METHOD

(75) Inventors: Phil Robertson, Greensboro, NC (US); John S. McSpadden, Kernersville, NC (US); William P. Shermer, Greensboro, NC (US); Seifollah Nanaji, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/046,980

(22) Filed: Jan. 31, 2005

(65) Prior Publication Data

US 2005/0126307 A1    Jun. 16, 2005

Related U.S. Application Data

(63) Continuation-in-part of application No. 10/634,137, filed on Aug. 4, 2003, now Pat. No. 6,935,191.

(51) Int. Cl.
  *G01F 1/05*  (2006.01)
  *B67D 5/08*  (2006.01)

(52) U.S. Cl. .......................... 73/861.79; 73/861.75; 222/52; 222/63; 702/45

(58) Field of Classification Search .................. None
  See application file for complete search history.

(56) References Cited

U.S. PATENT DOCUMENTS 2,678,658 A    5/1954    Rittenhouse ............... 137/235
2,773,251 A   12/1956    Snyder ..................... 137/487.5
3,524,465 A    8/1970    Sadler ......................... 137/115
3,724,808 A    4/1973    Sugden, Jr. ................... 251/30
4,244,396 A    1/1981    Friedland et al. ........ 137/487.5
4,343,336 A    8/1982    Trygg ......................... 141/218
4,397,405 A    8/1983    Batson ......................... 222/14
4,487,238 A   12/1984    Carder, Sr. .................. 141/206
4,559,982 A   12/1985    Fink, Jr. ..................... 141/206

(Continued)

FOREIGN PATENT DOCUMENTS

DE           698486 C      11/1940

(Continued)

OTHER PUBLICATIONS

"Standard for Safety", Power-Operated Pumps for Petroleum Product Dispensing Systems, UL 79, Underwriters Laboratories, Feb. 23, 1981, p. 8.

(Continued)

*Primary Examiner*—Harshad Patel
(74) *Attorney, Agent, or Firm*—Withrow & Terranova, PLLC

(57) ABSTRACT

A flow switch used in conjunction with a fuel meter in a fuel dispenser to determine when fuel is flowing. A flow switch can only be activated if fuel is flowing through the flow path of the flow switch. If fuel is flowing as indicated by the fuel flow switch, but the meter is not registering fuel flow, there is a meter error, which may be an error internally with components of the meter and/or a pulser that generates pulse signals indicative of fuel flow. If the meter pulser is registering fuel flow, but the flow switch is not registering fuel flow, then an error exists with the flow switch. If fuel is flowing and there are no errors, both the meter and the flow switch should indicate fuel flow.

61 Claims, 16 Drawing Sheets

U.S. PATENT DOCUMENTS

| | | | |
|---|---|---|---|
| 4,573,346 A | 3/1986 | Zacharias, Jr. | 73/61.1 R |
| 4,978,029 A | 12/1990 | Furrow et al. | 222/1 |
| 4,986,445 A | 1/1991 | Young et al. | 222/71 |
| 5,036,710 A | 8/1991 | King | 73/861.04 |
| 5,162,624 A | 11/1992 | Duksa | 200/81.9 M |
| 5,178,197 A | 1/1993 | Healy | 141/217 |
| 5,225,641 A | 7/1993 | Weld et al. | 200/81.9 R |
| 5,228,594 A | 7/1993 | Aslin | 222/63 |
| 5,303,842 A | 4/1994 | Harp et al. | 220/562 |
| 5,325,706 A * | 7/1994 | Grose | 222/52 |
| 5,421,545 A | 6/1995 | Schexnayder | 251/30.02 |
| 5,447,062 A * | 9/1995 | Kopl et al. | 73/861.78 |
| 5,689,071 A | 11/1997 | Ruffner et al. | 73/861.84 |
| 5,717,564 A | 2/1998 | Lindale | 361/600 |
| 5,831,176 A | 11/1998 | Morgenthale et al. | 73/861.77 |
| 5,934,507 A | 8/1999 | Motosugi | 222/23 |
| 5,954,080 A | 9/1999 | Leatherman | 137/14 |
| 6,000,423 A | 12/1999 | Roloson et al. | 137/334 |
| 6,173,734 B1 | 1/2001 | Olivas et al. | 137/460 |
| 6,227,409 B1 | 5/2001 | Brown | 222/1 |
| 6,240,943 B1 | 6/2001 | Smith | 137/1 |
| 6,382,246 B1 | 5/2002 | Mori et al. | 137/554 |
| 6,412,510 B1 | 7/2002 | Johnson | 137/14 |
| 6,435,204 B1 | 8/2002 | White et al. | 137/234.6 |
| 6,575,206 B1 | 6/2003 | Struthers et al. | 141/94 |
| 6,651,517 B1 | 11/2003 | Olivier | 73/861.79 |
| 6,692,535 B1 | 2/2004 | Olivier | 73/861 |
| 6,763,974 B1 | 7/2004 | Shermer et al. | 222/40 |

FOREIGN PATENT DOCUMENTS

| | | |
|---|---|---|
| DE | 19714587 C | 5/1998 |
| EP | 0391806 | 10/1990 |
| FR | 2504907 | 11/1982 |
| FR | 2527195 | 11/1983 |
| GB | 2141828 A | 1/1985 |
| WO | WO 99/32394 | 7/1999 |

OTHER PUBLICATIONS

"Standard for Safety", Power-Operated Pumps for Petroleum Product Dispensing Systems, UL 87, Underwriters Laboratories, Sep. 24, 1990, pp. 9-10.

* cited by examiner

FUEL DISPENSER FUEL METER ERROR DETECTION DEVICE, SYSTEM AND METHOD

RELATED APPLICATIONS

This patent application is a continuation-in-part application of application Ser. No. 10/634,137 entitled "Fuel Dispenser Fuel Flow Meter Device, System, and Method," filed on Aug. 4, 2003 now U.S. Pat. No. 6,935,191, incorporated herein by reference in its entirety.

This patent application is related to U.S. Pat. No. 6,763,974, entitled "Dual Piston/Poppet Flow Switch," and its divisional applications, U.S. Pat. No. 6,827,236 and application Ser. No. 10/819,747, all of which are incorporated herein by reference in their entireties.

FIELD OF THE INVENTION

The present invention relates to a device, system and method for detecting a lock-up error condition in a meter, and in particular for a fuel meter that measures fuel in a fuel dispenser.

BACKGROUND OF THE INVENTION

In a typical transaction, a consumer may drive a vehicle up to a fuel dispenser in a fueling environment. The consumer arranges for payment, either by paying at the pump, paying the cashier with cash, using a credit card or debit card, or some combination of these methods. The nozzle is inserted into the fill neck of the vehicle, and fuel is dispensed into the gas tank of the vehicle. Displays on the fuel dispenser display how much fuel has been dispensed as well as a dollar value associated with the fuel that has been dispensed. The customer relies on the fuel dispenser to accurately measure the amount of fuel dispensed and charge the customer accordingly. One method customers sometimes use to control costs is to pay for a preset amount of fuel based on a dollar or volume amount, called a "pre-pay." Regulatory requirements, namely Weights & Measures, require that these customers receive all of the fuel for which they have paid to a highly accurate degree.

Operating behind the scenes of this process are valves that open and close the fuel flow path and a flow meter inside the fuel dispenser that measures the amount of fuel dispensed. The purpose of the flow meter is to measure accurately the amount of fuel being delivered to the customer's vehicle so that the customer may be billed accordingly and fuel inventory tracking may be undertaken. As noted, for preset dollar or volume transactions (pre-pays), the fuel dispenser relies on the flow meter to measure the fuel dispensed so as to know when to terminate the fuel flow.

Some fuel dispenser fuel flow meters are positive displacement meters, meaning that the actual displacement of the fuel is measured rather than measuring the flow rate and converting the flow rate into a volume. One example of an positive displacement meter that may be used is described in U.S. Pat. No. 5,447,062, entitled "Apparatus for measuring quantities of liquid in gasoline pumps of motor vehicle filling stations," (hereinafter the "'062 patent") incorporated herein by reference in its entirety. The '062 patent describes an axial meter that measures the displacement of a fluid by determining the number of rotations of axial spindles located inside the flow path of the meter.

As fluid enters the inlet port of the axial meter in the '062 patent, the fluid encounters two interlocked axial spindles, which causes the spindles to rotate. The outer edges of the spindles are located in close proximity to the internal housing of the meter, but they do not touch. Ball-bearings are provided on the shafts supporting the spindles to the housing of the meter so that the spindles can rotate freely. For every turn of the spindles, a given volume of fluid is displaced through the outlet of the meter. As the axial spindles rotate, a measuring transducer detects the rotation of the spindles so that the number of revolutions is known and can be electrically communicated to a control system and thus the volume of fluid displaced in also known.

A problem may occur when using a meter that relies on rotating components within to measure fluid like in the '062 patent. Using the example of the meter in the '062 patent, if the spindles lock-up meaning that they cannot rotate, such as would happen if debris blocked the spindles or the ball bearings failed, fluid would continue to flow around the edges of the spindles between the small gap between the outer edges of the spindles and the inner housing of the meter. The flow rate, however, would be reduced. A control system would not register fuel flow even though fuel is flowing, because the measuring transducer would not detect rotation of the spindles. In the example of the meter being used to measure fuel delivery from a fuel dispenser, it is not possible for a control system to detect the difference between no detection of rotation of the spindles due to the customer not squeezing the nozzle handle, and no detection of rotation of spindles due to a lock-up of the spindles preventing them from rotating. In the later instance, fuel is being delivered although not registered and not charged to the customer.

Therefore, a need exists for a control system to be able to distinguish between meter lock-up or other failure that prevent pulses indicative of flow to be generated by the meter, versus no request for delivery in the instance of no flow being detected by a measuring transducer or other measurement means to detect rotation of rotational components within a meter.

SUMMARY OF THE INVENTION

The present invention is directed to a flow switch that operates in a fuel dispenser to detect and communicate when fuel is flowing in the fuel dispenser and being delivered to a vehicle. The present invention may also be used with any metering system and is not limited to a fuel dispenser.

In the embodiment of a fuel dispenser, a control system of the fuel dispenser receives a signal from the flow switch as an absolute indication that fuel is being delivered. If the fuel meter incurs any problems such that fuel is continuing to flow, but the meter is not registering flow and thus not communicating a signal indicative of flow to a control system in the fuel dispenser, the control system determines that the fuel is flowing by receipt of a signal from the flow switch, even though the meter is not registering flow. In this manner, free fuel is not delivered to a customer due to a meter malfunction, and the controls system of the fuel dispenser is able to detect the error condition to alert service or operational personnel of the meter malfunction for corrective measures to be taken.

In one embodiment of the present invention, the fuel flow meter of the fuel dispenser is an axial flow meter like that described in the '062 patent and referenced herein in the Background of the Invention. After fuel exits the shear valve in the fuel dispenser, the fuel enters the fuel flow meter. A flow switch is located downstream of the fuel flow meter so that a control system in the fuel dispenser has knowledge of when fuel flow is actually occurring in the fuel dispenser and when it is not. Alternatively, the flow switch could be located on the inlet side of the fuel flow meter either proximate to the fuel flow meter or before other components on the inlet side of the fuel flow meter.

As fuel leaves the fuel meter, the fuel enters a flow switch, or vice versa, the flow switch generates a flow switch communication signal via a flow switch communication line to a control system to communicate when fuel is flowing through the meter. After the fuel enters the flow switch, it exits through the fuel conduit to be delivered to the hose and nozzle for eventual delivery into the fuel tank of a vehicle. The flow switch is placed inline to the fuel flow path so that the control system can distinguish between an error in the meter or pulser and when fuel is not flowing because a customer is not squeezing the nozzle. If the flow switch is registered as open, but the meter is not generating pulses via a pulser signal indicative of flow, then there is a meter or pulser error. Conversely, if the meter is generating pulses on the pulser signal, but the flow switch is not registered as open, there is flow switch error. The control system may execute a state machine or process to detect when there is a meter or pulser error, or a flow switch error. The control system may employ timers to determine if a signal from the pulser signal or a signal from the flow switch is received in time or properly when detecting errors. The control system may further communicate any such errors to a site controller or tank monitor in the fueling forecourt, or to a remote system so that an operator can be notified of the error to take corrective measures. Further, alarms and error logs may be generated.

In one embodiment of the present invention, the flow switch is a single poppet valve that is incorporated into a flow switch housing. The poppet valve contains a spring to form a spring-loaded housing such that the force of fuel flow applies pressure to the spring and causes an indicator or sensor coupled to the poppet valve to generate a signal over a sensor communication line to the control system. In this manner, the control system detects when fuel is flowing through the flow switch for the purposes of accurately measuring the flow rate and/or volume of fuel flow. In exemplary embodiments, the indicator may be a Hall-effect sensor, an ultrasonic sensor, a magnetic reed switch, or the like, so as to help track the movement of the poppet. After the fuel exits the flow switch, the fuel is eventually dispensed to a hose and nozzle and into a vehicle. The valve can also act as a check valve to allow fuel to only flow in one direction thereby preventing backflow.

In another embodiment, a dual piston/poppet is used as the flow switch. The dual piston/poppet acts as a valve and includes two poppets to handle both slow fuel flow and high fuel flow conditions in the fuel dispenser to accurately determine when fuel is flowing and when fuel is not flowing. A single poppet flow switch may not be able to properly determine when fuel is flowing and when fuel is not flowing for both slow fuel flow and high fuel flow conditions. Slow fuel flow conditions exist at the beginning of a dispensing transaction and when the fuel dispenser slows down fuel delivery during a pre-pay transaction to deliver an exact amount of fuel according to the amount of the pre-pay. This alternative valve also acts as a check valve.

The dual piston/poppet valve operates in one of three modes. The first mode is the fully closed mode where both pistons are closed and no fuel flows through the valve. The second mode is a slow flow open mode. In this mode, a secondary or bypass fuel path is open and fuel flows relatively slowly through the valve. The indicator, if present, tells the control system that the bypass fuel path is open, and thus the control system knows to accept input from the flow meter as non-spurious. The third mode is a high flow open mode. In this mode, a primary fuel path is open concurrently with the secondary fuel path, and fuel flows quickly through the valve. Because the secondary fuel path is open, the indicator, if present, tells the control system to accept input from the flow meter. The two-fuel path arrangement helps optimize the valve for use with an inferential flow meter in slow flow and high flow situations regardless of the existence of the indicator. The indicator helps the control system of the fuel dispenser know when to accept input from the flow meter.

The valve has a housing with a primary fuel flow path on a primary axis of the housing. The primary fuel flow path is blocked by a normally closed primary piston. The primary piston is kept normally closed by a primary spring. A secondary fuel flow path routes around the primary piston. The secondary fuel flow path is blocked by a normally closed secondary piston. The secondary piston is likewise kept normally closed by a secondary spring. The force required to open the secondary piston is comparatively less than that required to open the primary piston. The secondary piston is also connected to a magnet or other position sensible element that acts as the indicator such that movements of the secondary piston may be detected.

In use, the valve initially receives fuel at a slow rate. This fuel hits the primary piston and is blocked. The fuel is thus shunted into the secondary fuel flow path where the fuel encounters the secondary piston. The secondary spring on the secondary piston is weak enough such that the slow rate of fuel is sufficient to compress the secondary spring, thereby opening the secondary fuel flow path. Opening the secondary piston moves the position sensible element such that a sensor may detect the movement of the position sensible element. The rate of fuel flow increases until the pressure on the primary piston is enough to compress the primary spring, thereby opening the primary fuel flow path. Fuel then flows through both the primary fuel path and the secondary fuel path during the majority of the fueling transaction.

As the fueling transaction ends, the process is reversed. The fuel flow rate slows, lowering the pressure on the primary piston. The primary spring closes the primary piston, leaving the secondary fuel path open. When the fuel flow is terminated, such as at the end of the transaction, the pressure on the secondary piston abates, and the secondary spring closes the secondary piston. The closing of the secondary piston moves the position sensible element, and the control system is informed to ignore further signals from the flow meter. Even when fuel flow is terminated abruptly and both pistons close at the same time, the movement of the position sensible element informs the control system to ignore further signals from the flow meter.

In exemplary embodiments, the indicator may be a Hall-effect sensor, an ultrasonic sensor, a magnetic reed switch, or the like, so as to help track the movement of the secondary piston. Flow straighteners may also be included on both the inlet and/or outlet sides of the dual poppet valve flow switch.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is directed to a flow switch that operates in a fuel dispenser to detect and communicate when fuel is flowing in the fuel dispenser and being delivered to a vehicle. The control system of the fuel dispenser receives a signal from the flow switch as an absolute indication that fuel is being delivered. If the fuel meter incurs any problems such that fuel is continuing to flow, but the meter is not registering flow and thus not communicating a signal indicative of flow to a control system in the fuel dispenser, the control system determines if the fuel is flowing by receipt of a signal from the flow switch even though the meter is not registering flow. In this manner, free fuel is not delivered to a customer due to a meter malfunction, and the control system of the fuel dispenser is able to detect the error condition to alert service or operational personnel of the meter malfunction for corrective measures to be taken.

A discussion of the fuel meter in combination with a flow switch according to the invention is discussed below starting at FIG. 4. Before these aspects of the present invention are described, some background information of typical fuel dispensers and their components is described first as illustrated in FIGS. 1–3.

Figure 1:
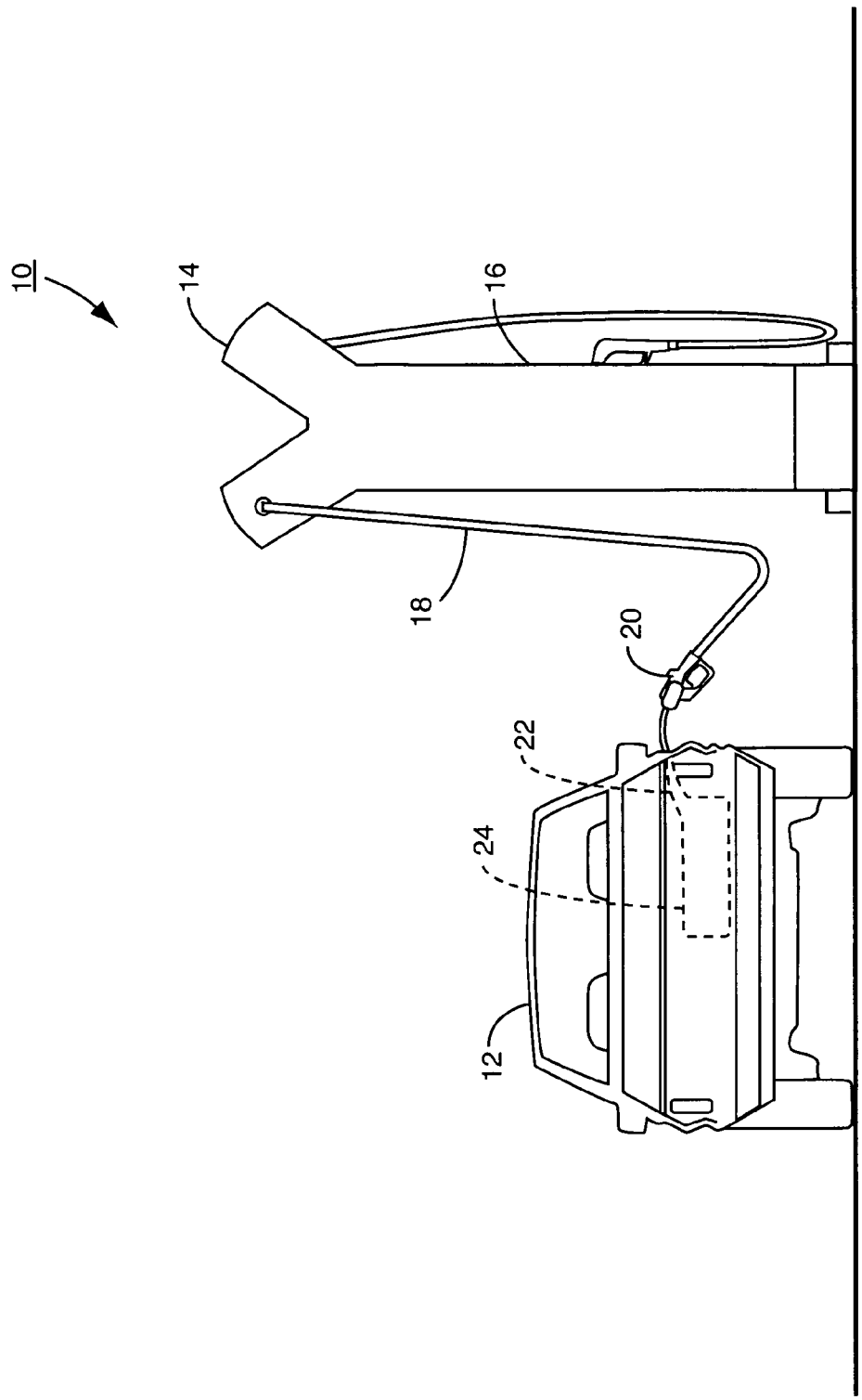
FIG. 1 illustrates a fuel dispenser involved in a fueling transaction in the prior art.

FIG. 1 illustrates a typical fueling environment 10 with a vehicle 12 being fueled by a fuel dispenser 14. The fuel dispenser 14 includes a housing 16 with a hose 18 extending therefrom. The hose 18 terminates in a manually operated nozzle 20 adapted to be inserted into a fill neck 22 of the vehicle 12. Fuel flows from an underground storage tank (UST) (not illustrated) through the fuel dispenser 14, out through the hose 18, down the fill neck 22 to a fuel tank 24 of the vehicle 12 as is well understood. The fuel dispenser 14 may be the ECLIPSE® or ENCORE® sold by the assignee of the present invention or other fuel dispensers as needed or desired, such as that embodied in U.S. Pat. No. 4,978,029, which is hereby incorporated by reference in its entirety.

Figure 2:
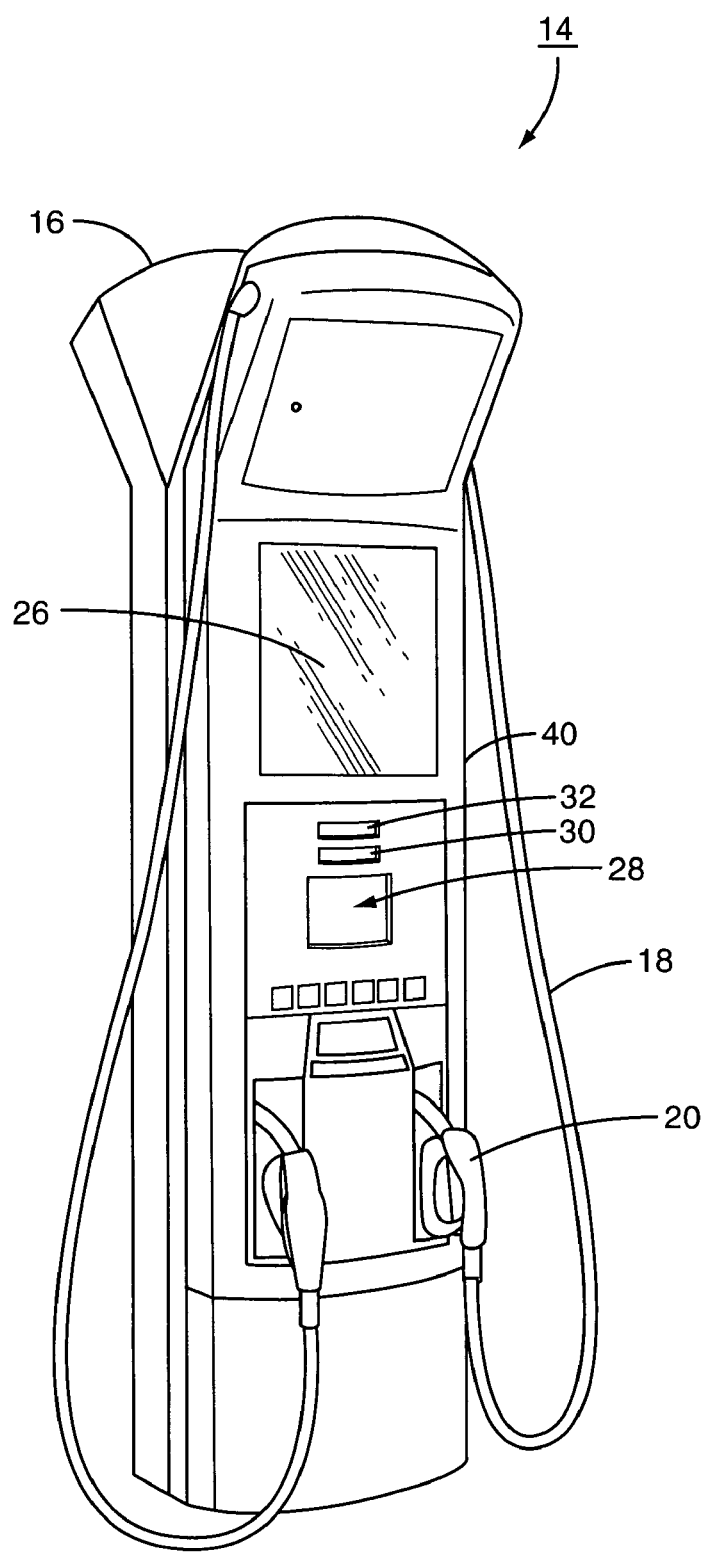
FIG. 2 illustrates a partial front view of a fuel dispenser in the prior art.

The front of the fuel dispenser 14 is illustrated in FIG. 2. The fuel dispenser 14 may have an advertising display 26 proximate the top of the housing 16 and a video display 28 at eye level. The video display 28 may be the Infoscreen® manufactured and sold by Gilbarco Inc. The video display 28 may be associated with auxiliary information displays relating to an ongoing fuel transaction that includes the number of gallons of fuel dispensed displayed on a gallons display 30, and the price of such fuel dispensed on a price display 32. The displays 26, 28, 30, 32 may include the capability of displaying streaming video and may include liquid crystal displays (LCDs) as needed or desired.

Figure 3:
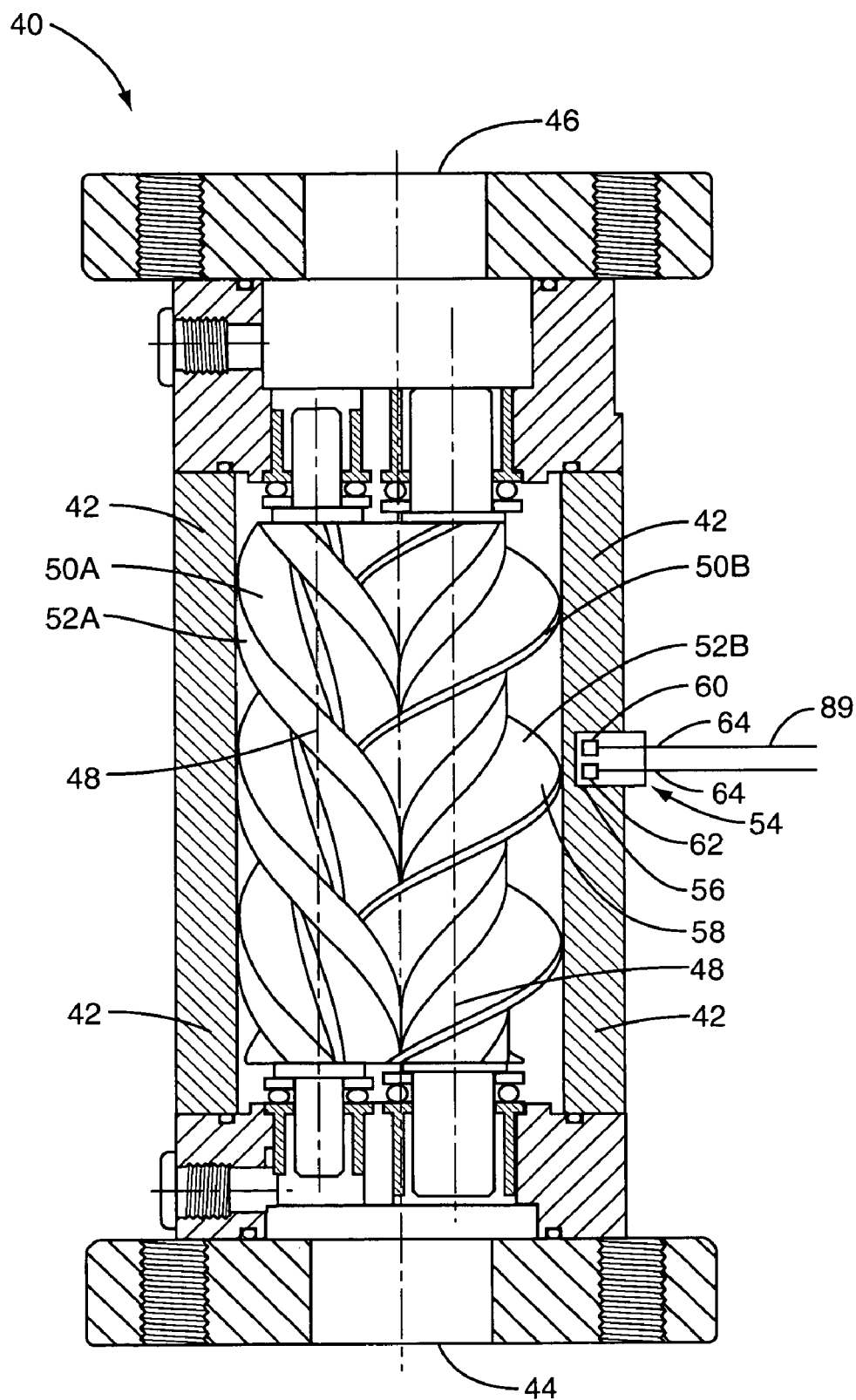
FIG. 3 illustrates an axial flow meter that is one meter embodiment of the present invention.

FIG. 3 illustrates one embodiment of a fuel meter 40 that may be used in the present invention. The meter 40 is known as an axial meter, and is similar to the meter described in U.S. Pat. No. 5,447,062, incorporated herein by reference in its entirety. The meter 40 includes rotational components, discussed below, that are used to indicate the amount of fuel flowing through the meter 40 and which, if locked up or malfunctioning or if there is any other problem with the meter or its pulser that generates pulse signals, will not register fuel flow even though fuel may be flowing through the meter in a given fuel dispensing transaction.

The meter 40 is comprised of a housing 42 that may be constructed out of a high permeable material, such as monel, a nickel-copper alloy, steel, stainless steel, or 400-series non-magnetic stainless steel, for example. The housing 42 is hollow and forms an inlet port 44 and an outlet port 46 for fluid or fuel to enter into the meter 40 and to leave the meter 40, respectively. A shaft 48 is placed internal to the housing 16 to support one or more rotational components in the form of spindles 50A, 50B. In the meter 40 illustrated in FIG. 3, there are two interlocking spindles 50A, 50B that rotate as fluid or fuel is displaced through the meter 40.

The spindles 50A, 50B rotate in an axis perpendicular to the axis of the shaft 48. The spindles 50A, 50B contain one or more threads 52A, 52B. As the fluid or fuel passes through the inlet port 44 and across the spindles 50A, 50B, the spindles 50A, 50B rotate. Each rotation of the spindles 50A, 50B represents a given volume of liquid or fuel displaced through the meter 40. Any type of sensor may be used to detect rotation of the spindles 50A, 50B; however, in the example of FIG. 3, a Hall-effect sensor 54 is provided, as is well known to one of ordinary skill in the art and described in U.S. Pat. No. 6,397,686 and application Ser. No. 10/953,168 entitled "Increased Sensitivity For Liquid Meter," both of which are incorporated herein by reference in their entireties, to detect the rotation of the spindles 50A, 50B in the meter 40.

In order to place the Hall-effect sensor 54 close enough to the spindles 50A, 50B to detect their rotation, a port 56 is included in the housing 42 during the manufacture of the meter 40 so that the port 56 extends substantially into the housing 42 proximate to the spindles 50A, 50B. The port 56 cannot fully penetrate the housing 42 since it is not desired to interrupt the fuel flow path. The port 56 allows the Hall-effect sensor 54 to be placed inside the port 56 at the surface area of the inner housing 16.

In the example of using a Hall-effect sensor 54 as the sensing device to detect rotation of the spindles 50A, 50B, the spindle 50B that is located proximate to the sensor 54 is modified to include at least one region of discontinuity 58, which is provided in such a manner as to exhibit magnetic properties. For example, if spindle 50B is made of a magnetic or ferrous material, the region of discontinuity 58 in the outer surface of spindle 50B will generate a characteristic magnetic flux that is detectably distinct from the magnetic flux generated by the adjacent surface regions, which conform to the conventional cylindrical shape for the spindle 50B. As will be described further, these variations in magnetic flux associated with the region of discontinuity 58 is detected by the Hall-effect sensor 54 and is used to provide detection of the rotation of the spindles 50A, 50B. In this illustration of the meter 40 in FIG. 3, the sensor 54 is placed proximate to spindle 50B and thus the region of discontinuity 58 is provided on spindle 50B, but the sensor 54 could be located proximate to spindle 50A to detect rotation of the spindles 50A equally as well since the spindles 50A, 50B are interlocked in this example.

The Hall-effect sensor 54 comprises a first Hall-effect sensing element 60 and a second Hall-effect sensing element 62 having respective electrical leads 64. The discrete Hall-effect elements 60, 62 may be provided in any conventional form known to those skilled in the art, such as a current-carrying conductor. In accordance with the present invention, the Hall-effect elements 60, 62 are placed in a sufficiently proximate relationship relative to spindle 50B so as to enable the region of discontinuity 58 to exert a characteristic magnetic influence upon each of the Hall-effect elements 60, 62 as the region of discontinuity 58 rotates in succession past elements 60, 62.

In another variation of the embodiment of FIG. 3 not shown, a second port with another sensor may be provided to allow detection of direction of rotation of the spindle 50B as previously described above. Further, any other type of meter may be used with the present invention, including a turbine rotor inferential meter as described in U.S. Pat. No. 5,689,071 ("'071 patent"), incorporated herein by reference in its entirety, and the rotational component that locks up or malfunctions could be the turbine rotors that rotate inside the meter housing of the meter in the '071 patent.

Figure 4:
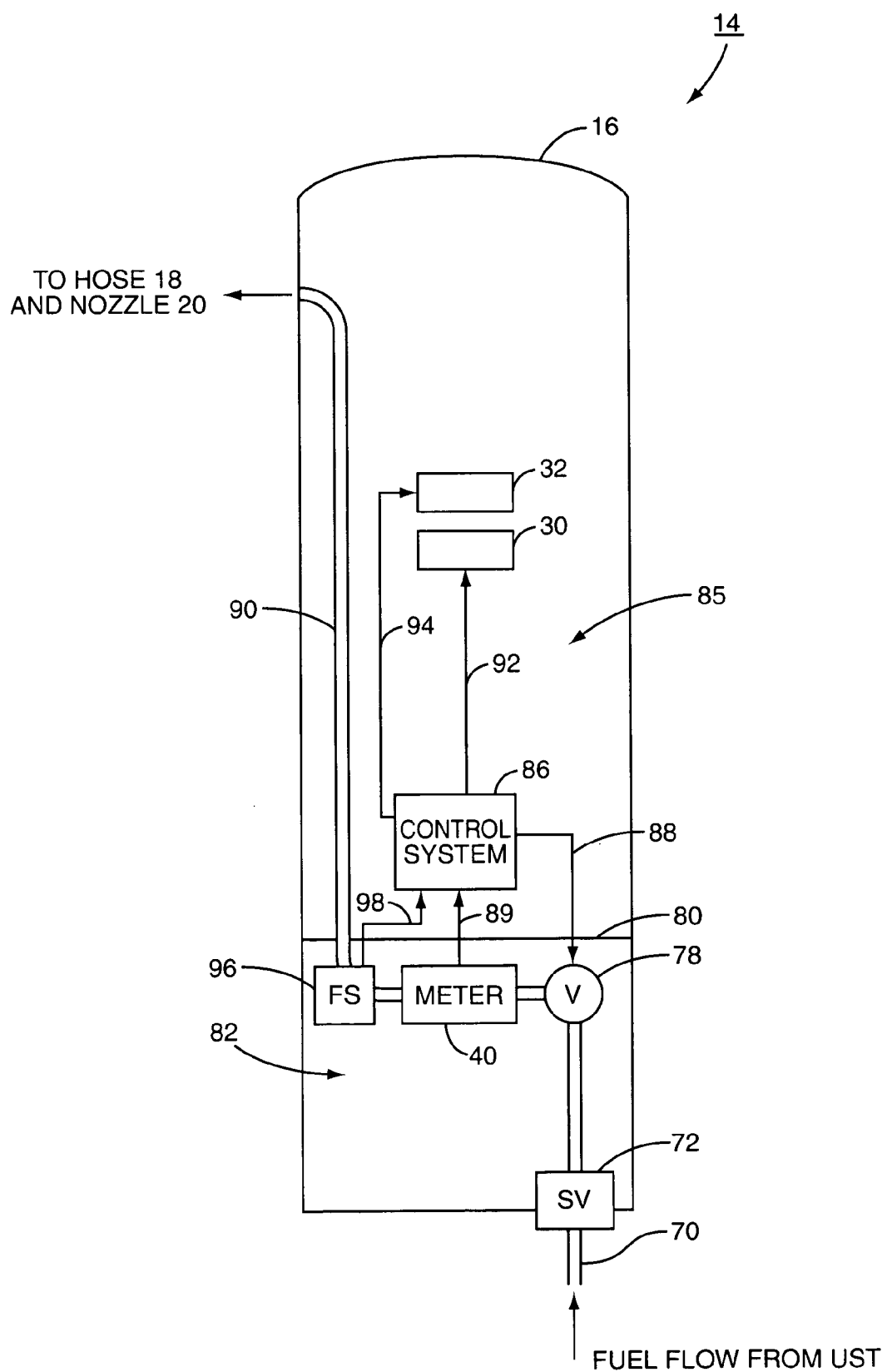
FIG. 4 illustrates a schematic diagram of a first embodiment of the fuel flow components of the fuel dispenser.

A schematic diagram of the internal fuel flow components of one example of the present invention is illustrated in FIG. 4 showing the meter 40 and flow switch 96. As illustrated in FIG. 4, the housing 16 of a fuel dispenser 14 is shown. Fuel may travel from an underground storage tank (UST) (not illustrated) via a fuel pipe 70, which may be a double-walled pipe having secondary containment as is well known. An exemplary underground fuel delivery system is illustrated in U.S. Pat. No. 6,435,204, which is hereby incorporated by reference in its entirety. The fuel pipe 70 may pass into the housing 16 first through a shear valve 72. The shear valve 72 is designed to cut off fuel flowing through the fuel pipe 70 if the fuel dispenser 14 is impacted, as is commonly known in the industry. One illustration of a shear valve 72 is disclosed in U.S. Pat. No. 6,575,206, which is hereby incorporated by reference in its entirety.

In most fuel dispensers 14, a submersible turbine pump (STP) (not illustrated) associated with the UST is used to pump fuel to the fuel dispenser 14. Some fuel dispensers 14 may be self-contained, meaning fuel is drawn to the fuel dispenser 14 by a pump controlled by a motor (neither illustrated) positioned within the housing 16. A valve 78 may be positioned upstream of a fuel meter 40. Alternatively, the valve 78 may be positioned downstream of the flow meter 40 (see FIG. 6). The fuel meter 40 and valve 78 are positioned in a fuel handling compartment 82 of the housing 16, as is well understood. The fuel handling compartment 82 is isolated from an electronics compartment 85 located above a vapor barrier 80. The fuel handling compartment 82 is isolated from any sparks or other events that may cause combustion of fuel vapors as is well understood and as is described in U.S. Pat. No. 5,717,564, which is hereby incorporated by reference in its entirety.

The flow meter 40 and valve 78 communicate through the vapor barrier 80 via a pulser signal line 89 to a control system 86 that is typically positioned within the electronics compartment 85 of the fuel dispenser 14. Another example of a two-chambered fuel dispenser 14 is described in U.S. Pat. No. 4,986,445, which is hereby incorporated by reference in its entirety. The control system 86 may be a microcontroller, a microprocessor, or other electronics with associated memory and software programs running thereon as is well understood. The control system 86 typically controls other aspects of the fuel dispenser 14, such as the displays 26, 28, 30, 32 and the like, as is well understood.

The control system 86 directs the valve 78, via a valve communication line 88, to open and close when fuel dispensing is desired or not desired. The valve 78 may be a proportional solenoid controlled valve, such as described in U.S. Pat. No. 5,954,080 for example, which is incorporated herein by reference in its entirety. If the control system 86 directs the valve 78 to open to allow fuel to flow to be dispensed, the fuel enters the valve 78 and exits into the fuel meter 40. The displaced volume of the fuel is measured by the fuel meter 40, as described above, and the fuel meter 40 communicates the displaced volume of fuel to the control system 86 via a pulser signal line 89. A pulse signal is generated on the pulser signal line 89 in the example illustrated in FIG. 3, by the leads 64 of the Hall-effect sensor 54. In this manner, the control system 86 uses the pulser signal from the pulser signal line 89 to determine the volume of fuel flowing through the fuel dispenser 14 and being delivered to a vehicle 12. The control system 86 updates the total gallons dispensed on the gallons display 30 via the gallons display communication line 92, as well as the price of fuel dispensed on the price display 32 via price display communication line 94.

In the embodiment illustrated in FIG. 4, as fuel leaves the fuel meter 40, the fuel enters a flow switch 96. The flow switch 96 generates a flow switch communication signal via the flow switch signal line 98 to the control system 86 to communicate when fuel is flowing through the fuel meter 40. After the fuel enters the flow switch 96, it exits through the fuel conduit 90 to be delivered to the hose 18 and nozzle 20 for eventual delivery into the fuel tank 24 of a vehicle 12. In the event that the control system 86 opens valve 78 to allow fuel to flow, the customer still controls whether fuel is dispensed by the dispenser 14 using control over the nozzle 20. Further, the control system 86 cannot assume that fuel is not flowing just because a signal is not received on the pulser signal line 89. This is because if there is a meter 40 malfunction, such as meter lock-up when rotational components of the meter cannot rotate, or a pulser failure, the meter 40 may not register fuel flow even though fuel is flowing. This is the reason that a flow switch 96 is placed inline to the fuel flow path so that the control system 86 can distinguish between an error in the meter 40 or pulser (illustrated as element 100 in FIG. 5 below) that generates the pulses signal on the pulser signal line 89 (referred to generally as "meter error") and when fuel is not flowing because a customer is not squeezing the nozzle 20.

Figure 5:
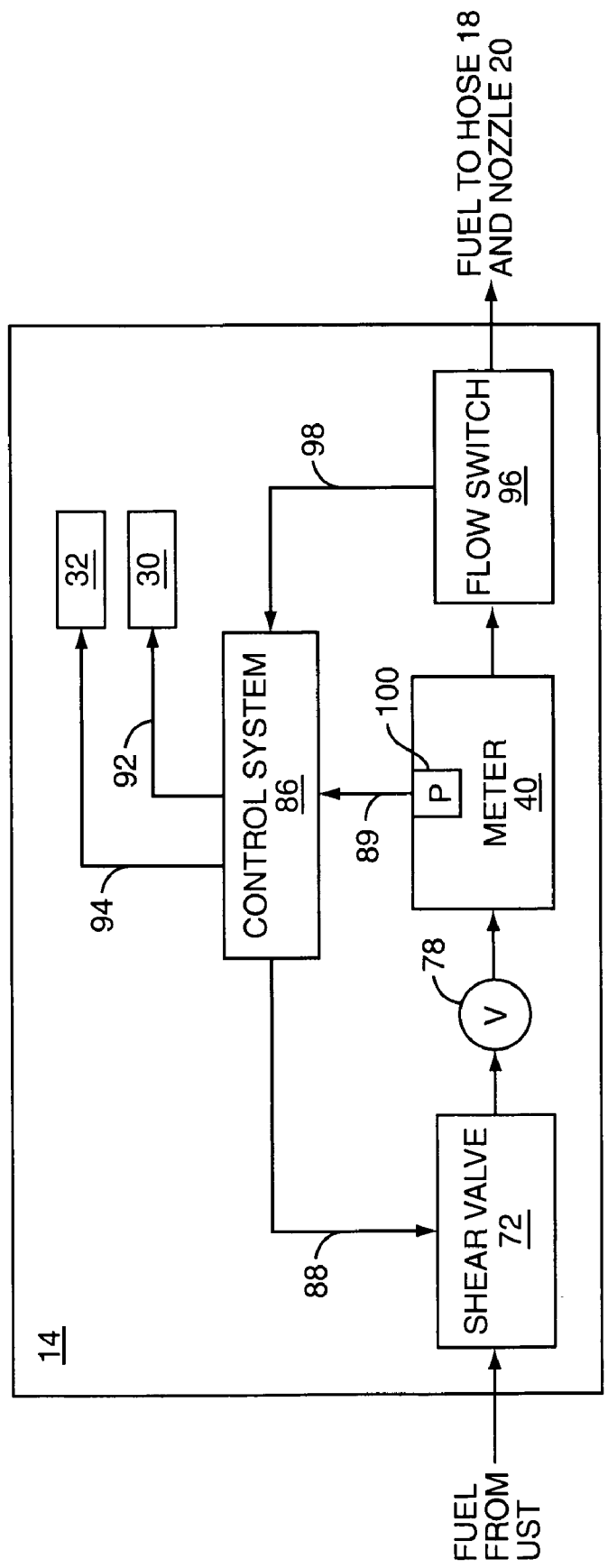
FIG. 5 illustrates a block diagram of the meter and flow switch according to one embodiment of the present invention.

FIG. 5 illustrates the same components illustrated in FIG. 4, but in a block diagram format, and thus an explanation will not be repeated. The explanation of FIG. 4 above is equally applicable to FIG. 5. The pulser 100 of the meter 50 is illustrated. A pulser 100 is a device that generates an electrical pulse signal on the pulser signal line 89 in response to sensor 54, which may be a Hall-effect sensor, detecting fuel flow inside the meter 40.

Figure 6:
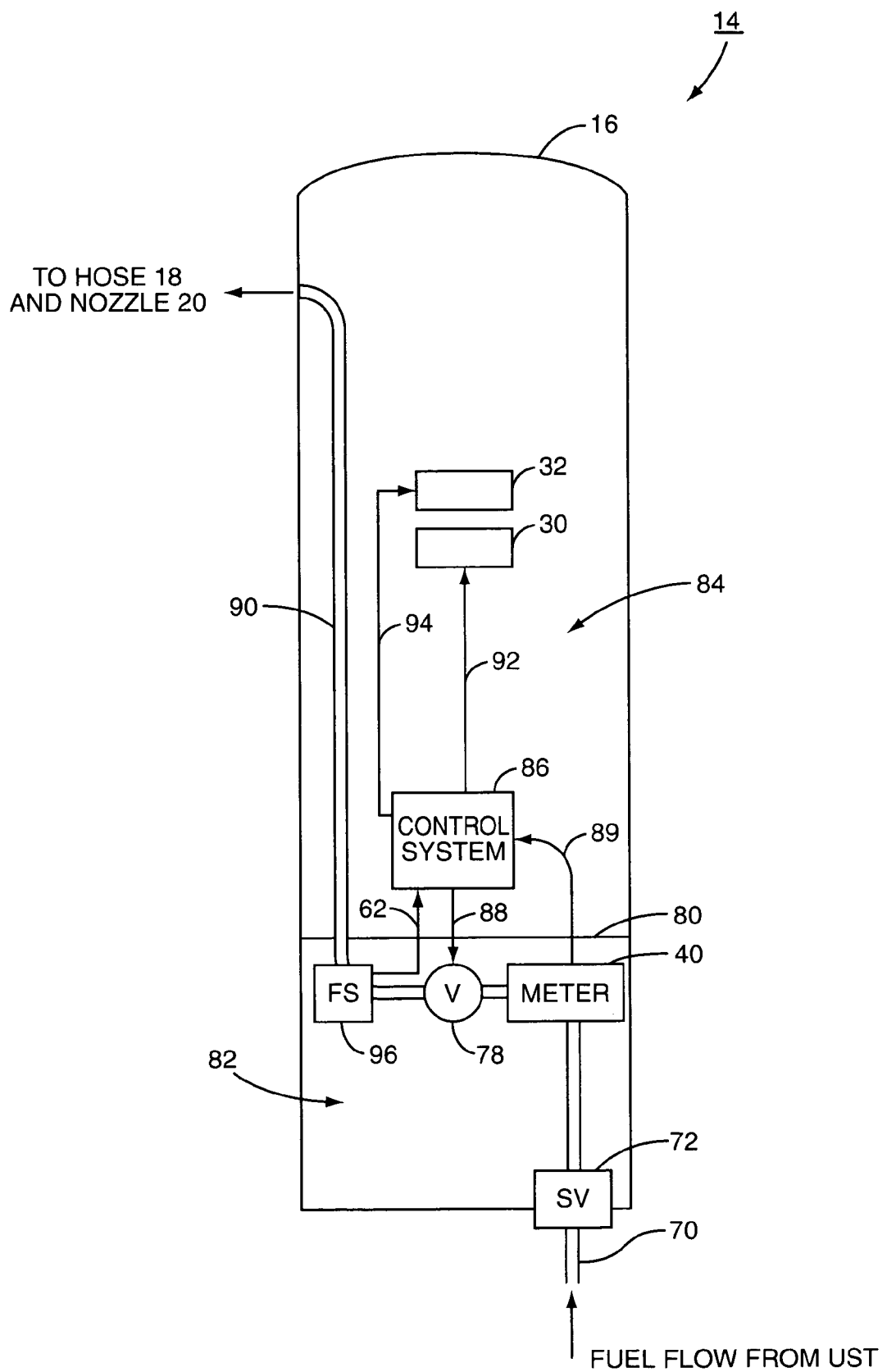
FIG. 6 illustrates a schematic diagram of a second embodiment of the fuel flow components of the fuel dispenser.

FIG. 6 is an illustration of a fuel dispenser 14 similar to that illustrated in FIG. 4. However, in FIG. 6, the fuel meter 40 and the valve 78 are rearranged. In FIG. 6, after fuel exits the shear valve 72, the fuel enters the fuel meter 40 first and then enters into the valve 78. This embodiment can also be used as well as the embodiment in FIG. 4 to perform the present invention. The control system 86 is still able to control fuel flow by the opening and closing of the valve 78 in this embodiment. Again, in this embodiment, the flow switch 96 is located downstream of the fuel meter 40 and valve 78 so that the control system 86 has knowledge of when fuel is actually occurring in the fuel dispenser and when it is not. Although not illustrated, the flow switch 96 could also be located on the inlet side of the fuel meter 40, either proximate to the meter 40, or before other components on the inlet side of the fuel flow meter 40 to allow the control system 86 to detect when fuel is flowing.

The remainder of this patent application will discuss more detailed aspects of the fuel flow switch 96 and its interaction with the control system 86 to allow the control system 86 to determine if fuel is flowing through the fuel dispenser 14, even though fuel is not being registered by the meter 40, and thus a meter 40 or pulser 100 error is present.

Figure 7:
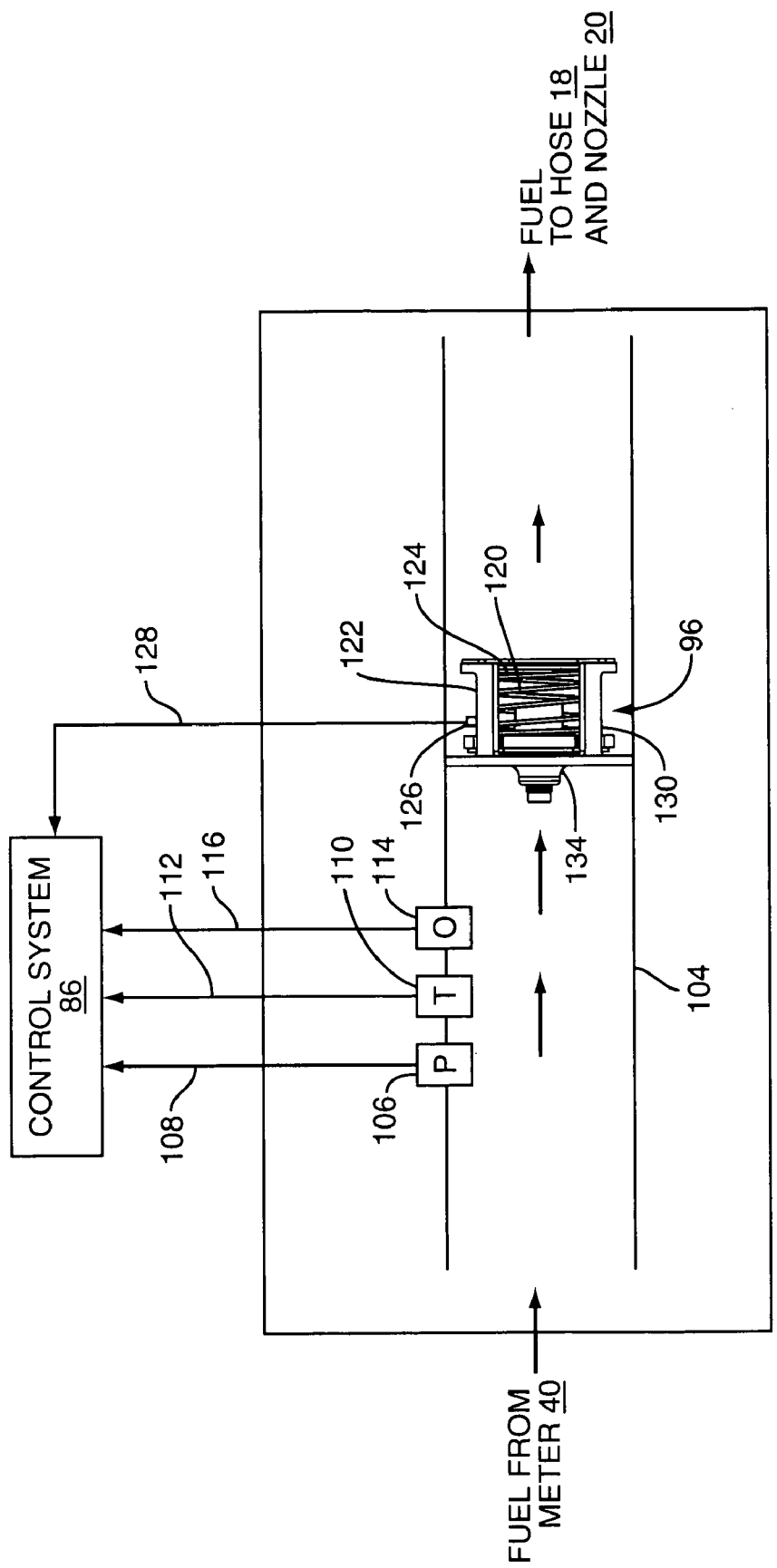
FIG. 7 illustrates a schematic diagram of one embodiment of a single poppet flow switch in accordance with one embodiment of the present invention.

FIG. 7 illustrates one embodiment of a single poppet-type flow switch 96 that may be used to detect fuel flow through meter 40. The flow switch 96 may be comprised of a housing 130, within which the components and various elements of the flow switch 96 are located, and also to create a fuel flow path for fuel to flow from the fuel meter 40 and/or valve 78. As fuel enters the flow switch 96 from the left-hand side of FIG. 7, it may encounter a pressure sensor 106, a temperature sensor 110, and/or an octane sensor 114. If a pressure sensor 106, temperature sensor 110, and/or octane sensor 114 are provided in a flow switch 96, these sensors are placed such that they are coupled to the internal fuel flow path of the flow switch 96. The pressure sensor 106, temperature sensor 110, and an octane sensor 114 are electronically coupled to the control system 86 via a pressure sensor communication line 108, a temperature sensor communication line 112, and an octane sensor communication line 116, respectively. In this manner, control system 86 can measure the pressure, temperature, and/or octane of the fuel flow for various reasons if desired or if these factors affect the accuracy of the fuel meter 40.

The pressure inside the flow switch 96 may be used to determine pressure drop for system diagnostics purposes. The temperature of the fuel flowing through the flow switch 96 may be used by the control system 86 to determine the density and/or viscosity of the fuel for adjusting the volume throughput of fuel through the fuel meter 40, including but not limited to temperature compensation, and/or make corrections for thermal expansion of fuel meter 40. The octane of the fuel flow passing through the flow switch 96 may be used by the control system 86 to detect and alert octane variations and/or presence of wrong fuel in the line.

Next, the fuel flow encounters a poppet valve 96 that is incorporated into the flow switch housing 130 and acts as the flow switch 96 in one embodiment of the present invention. The poppet valve 96 contains a spring 124 to form a spring-loaded housing such that the force of fuel flow applies pressure to the spring 124 and causes a sensor 126 coupled to the poppet valve 96 to generate a signal over a sensor communication line 128 to the control system 86. In this manner, the control system 86 detects when fuel is flowing through the flow switch 96 for the purposes previously described and later described in this application.

Figure 8B:
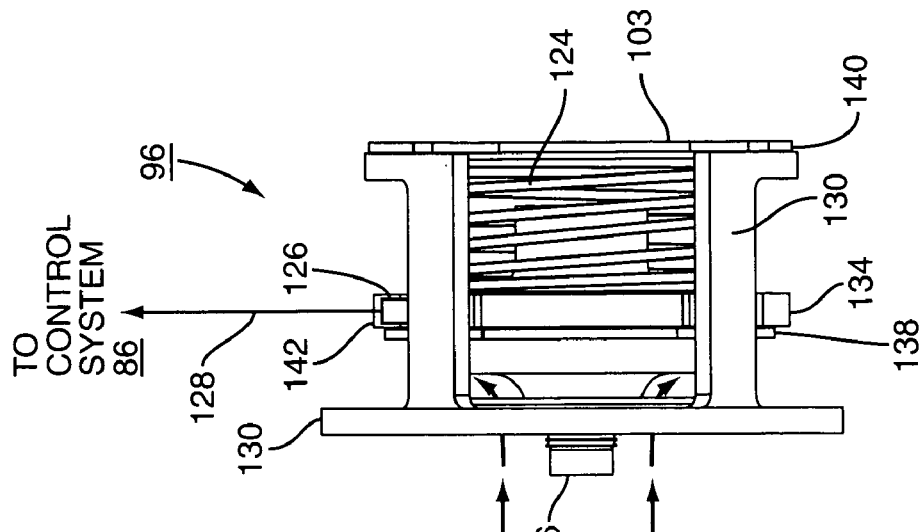
FIG. 8B illustrates a schematic diagram of a single poppet valve flow switch in an open position when fuel is flowing.
Figure 8A:
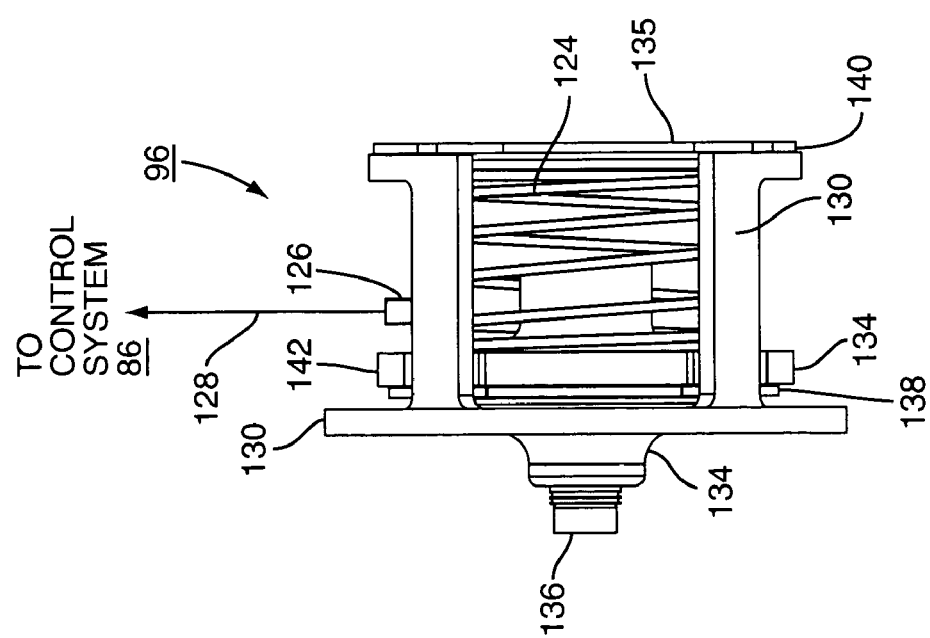
FIG. 8A illustrates a schematic diagram of a single poppet valve flow switch in a closed position when fuel is not flowing.
Figure 9:
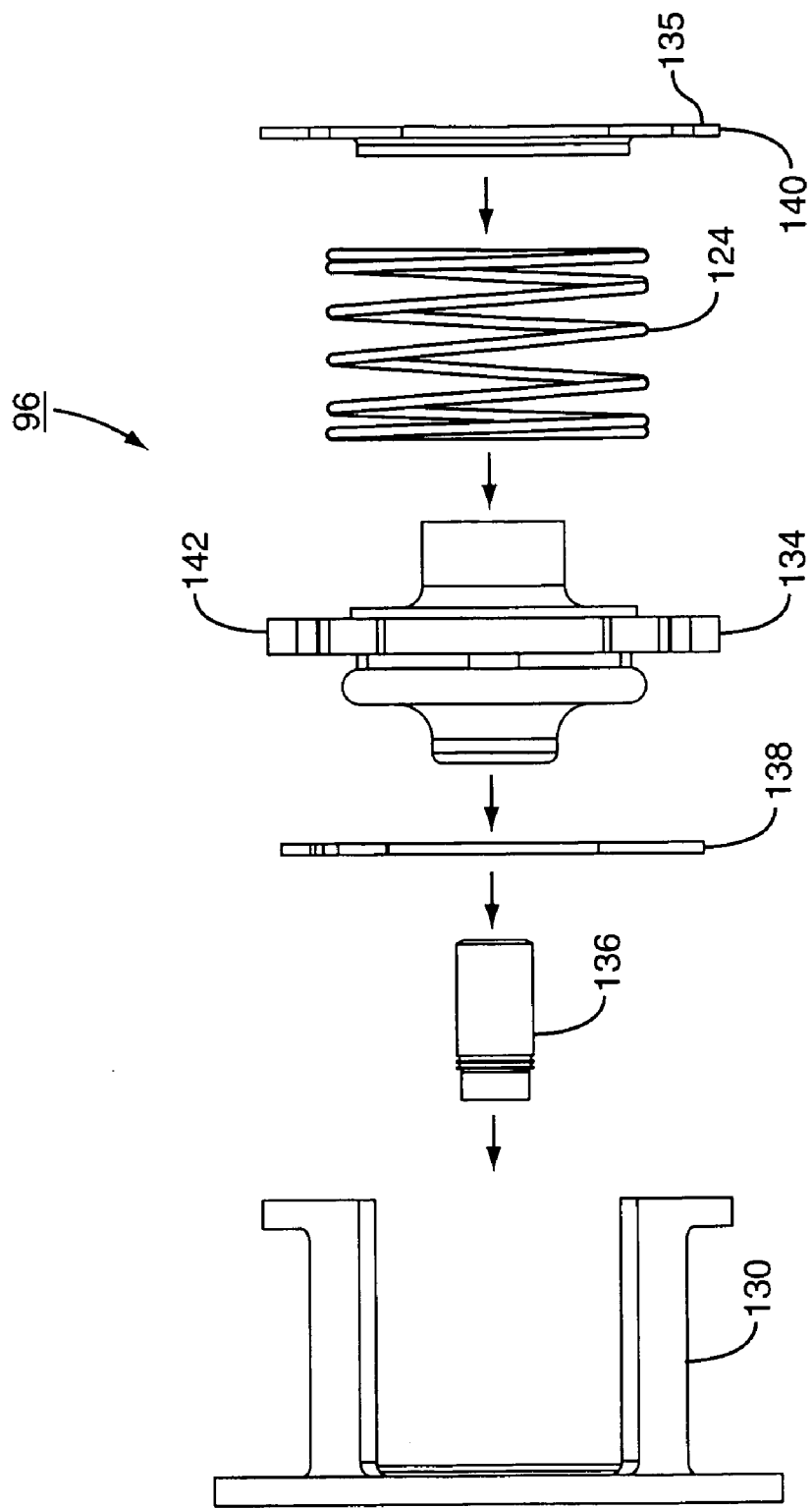
FIG. 9 illustrates an exploded view of the single poppet valve illustrated in FIGS. 8A and 8B and used at the flow switch in FIG. 7.

FIGS. 8A, 8B and 9 illustrate one embodiment of the flow switch 96 in the form of the poppet valve 96, as illustrated in FIG. 7. Please note that the present invention is not limited to any one particular design of a flow switch 96 and various other designs may be used with the present invention. The poppet valve 96 illustrated in FIG. 8A is comprised of a valve body 130 that forms a valve back 135. A piston 134 is located inside the valve body 130. A spring 124 is placed inside the valve body 130 between the valve back 135 and the piston 134 such that the piston 134 is spring loaded. The piston 134 contains a poppet head 142 that abuts the front of the valve body 130 separated by an o-ring 138 when the poppet valve 96 is in a normally closed position. A washer 140 is also used to separate the spring 124 from the valve back 135. A relief valve 136 is also coupled to the poppet head 142 so that any significant back pressure on the valve 96 going from the valve back 135 towards the poppet head 142 can be relieved for safety considerations. A sensor 126 is placed on the valve body 130 and is electronically coupled to the control system 86 via the sensor communication line 128.

FIG. 8B shows the flow switch 96 in the form of the poppet valve 96 in an open position when fuel is flowing. When fuel encounters the poppet head 142 and applies a force significant enough to compress the spring 124, the poppet head 142 is moved backwards and fuel flow is allowed to enter the valve body 130 and flow around the sides of the poppet head 142. Note that the width of the poppet head 142 is less than the diameter of the valve body 130 so that fuel can flow around the edges of the poppet head 142.

When the poppet head 142 moves back and encounters the same plane as where the sensor 126 is located on the valve body 130, the sensor 126 detects the poppet head 142 and sends a signal over the sensor communication line 128 to the control system 86. In this manner, the control system 86 knows that fuel is flowing due to the compression of the spring-loaded piston 134. In one embodiment, the sensor 126 is a Hall-effect sensor 126, and the Hall-Effect sensor 126 detects a position sensible element 142 on the poppet head 142, which is a magnetic material in this case. The Hall-effect sensor 126 detects the magnet in the position sensible element 192 and generates a signal over the sensor communication line 128 to the control system 86. The poppet valve 96 also acts as a check valve to only allow fuel to flow in one direction thereby preventing backflow, which can cause turbulence and inaccuracies in fuel flow measurement.

FIG. 9 illustrates an exploded view of the poppet valve 96 illustrated in FIGS. 7, 8A and 8B. The exploded view is self-explanatory with the previous explanation of the components of the poppet valve 96 described in FIGS. 8A and 8B.

Figure 10:
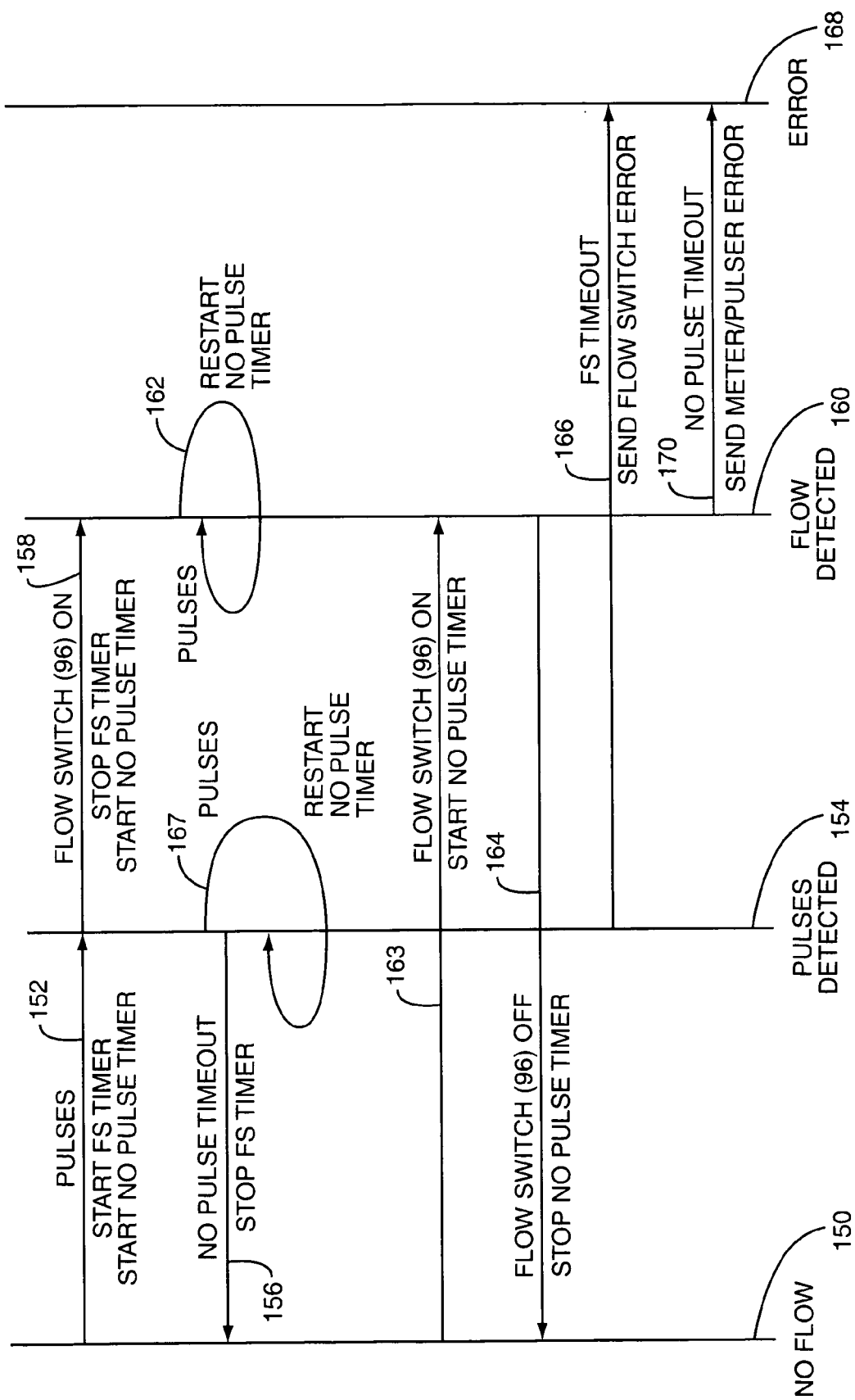
FIG. 10 illustrates a state diagram performed by the control system of the fuel dispenser to use a signal indicative of flow from the flow switch and a meter pulser signal to determine if there is a flow switch or meter error.

FIG. 10 illustrates a flow diagram of the operation of the control system 86 using pulse signals from the pulser signal line 89 to indicate fuel flow and a signal from the flow switch 96 indicative of whether there is actual fuel flow or not. If the control system 86 determines that there is flow of fuel via the flow switch 96, but pulser signals are not being received over the pulser signal line 89, this is indicative of a meter 40 or pulser 100 error or malfunction. This error or malfunction can be communicated to an operator or other systems so that corrective action can be taken. As previously discussed above, even if the control system 86 is not receiving a signal from the pulser signal line 89, fuel still may be flowing through the meter 40 due to a malfunction, including meter lock-up or lock-up of rotation components inside the meter 40.

As illustrated in FIG. 10, the control system 86 is initially in a "NO FLOW" state 150. If pulses are first received by the control system 86 from the pulser signal line 89 without first receiving a signal from the flow switch 96 via the flow switch signal line 98 (transition 152), the control system 86 starts or resets a "FLOW SWITCH (FS) TIMER" and a "NO PULSE TIMER," and enters the "PULSES DETECTED" state 154. If while in the state of "PULSES DETECTED" state 154, the "NO PULSE TIMER" times out, meaning that pulses are no longer being received (transition 156), the control system 86 returns back to the "NO FLOW" state 150. The "NO PULSE TIMER" is set to a value that gives the flow switch (96) enough time to register a signal on the flow switch signal line 98 indicative of flow, but that also a time that if expires, is indicative of a problem with the flow switch (96). If the control system 86 instead receives a signal from the flow switch 96 via the flow switch signal line 98 when in the "NO FLOW" state 150, the control system 86 will transition directly the "FLOW DETECTED" state 160 to then determine if pulses are being received in kind, as discussed below.

However, if when the control system 86 is in the "PULSES DETECTED" state 154, the "FS TIMER" times out (transition 166), meaning that a signal is not received by the flow switch 96 from the flow switch signal line 98 indicative of fuel flow within a specified period of time, this is indicative of a flow switch error in that pulses are being received by the meter 40 indicative of flow, but the flow switch 96 is not indicating flow. At this point, the control system 86 enters into an "ERROR" state 168, where a problem is logged with the operation of the flow switch 96. This is because the flow switch 96 should open and indicate flow if pulse signals are being received from the pulse signal line 89 from the meter 40.

As long as the control system 86 continues to receive pulses from the pulser 100 while in the "PULSES DETECTED" state 154 and the flow switch (96) timer has not timed out, the control system 86 will continue to say in the "PULSES DETECTED" state 154 as indicated by transition (167). Once the control system receives a signal from the flow switch 96 from the flow switch signal line 98 and if before the "FS TIMER" times out (transition 158), the control system 86 then stops the "FS TIMER" and starts or resets a "NO PULSE TIMER" and transitions to the "FLOW DETECTED" state 160. The "NO PULSE TIMER" is preferably set to a time that gives the pulser 100 enough time to signal fuel flow, but that if it expires, is indicative of a pulser 100 and/or meter 40 error.

Or, if a signal from the flow switch 96 is received via the flow switch signal line 98 when in the "NO FLOW" state 150 as discussed previously, the control system 86 will transition directly the "FLOW DETECTED" state 160. In this state, whether it be a result of a transition from the "NO FLOW" state 150, or the "PULSES DETECTED" state 154, the meter 40 and flow switch 96 are operating properly in that the flow switch 96 is registering fuel flow, and the meter 40 is generating pulses indicative of fuel flow as well, both of which are to occur together with a properly functioning flow switch 96 and meter 40. Thereafter, as long as pulses are received (transition 162) before the "NO PULSE TIMER" times out, the control system 86 continues to restart or reset the "NO PULSE TIMER" (transition 162) and return back to the "FLOW DETECTED" state 160 meaning that the meter 40 is operating properly by registering pulses indicative of fuel flow when the flow switch 96 has been activated indicative of fuel flow.

If while the control system 86 is in the "FLOW DETECTED" state 160, the "NO PULSE TIMER" times out, meaning that pulses are not being received from the meter 40 even though the flow switch 96 is activated indicating fuel flow (transition 170), the control system 86 transitions to the "ERROR" state 168 due to the fact that pulses are not being received by the meter 40 even though the flow switch 96 is activated. This means that there is a malfunction, which could be meter 40 lock-up since the meter 40 should generate pulses if the flow switch 96 is activated indicating fuel flow, or a pulser 100 error or malfunction.

If instead, when the control system 86 was in the "FLOW DETECTED" state 160, the flow switch 96 is deactivated, meaning that fuel was not flowing (transition 164), the control system 86 transitions back to the "NO FLOW" state 150. At this point, the control system 86 is back to the initial "NO FLOW" state 150 and will transition to another state as soon as either pulse signals from the pulse signal line 89 (transition 152), or a flow switch 96 activated signal (transition 163) is received.

Figure 11:
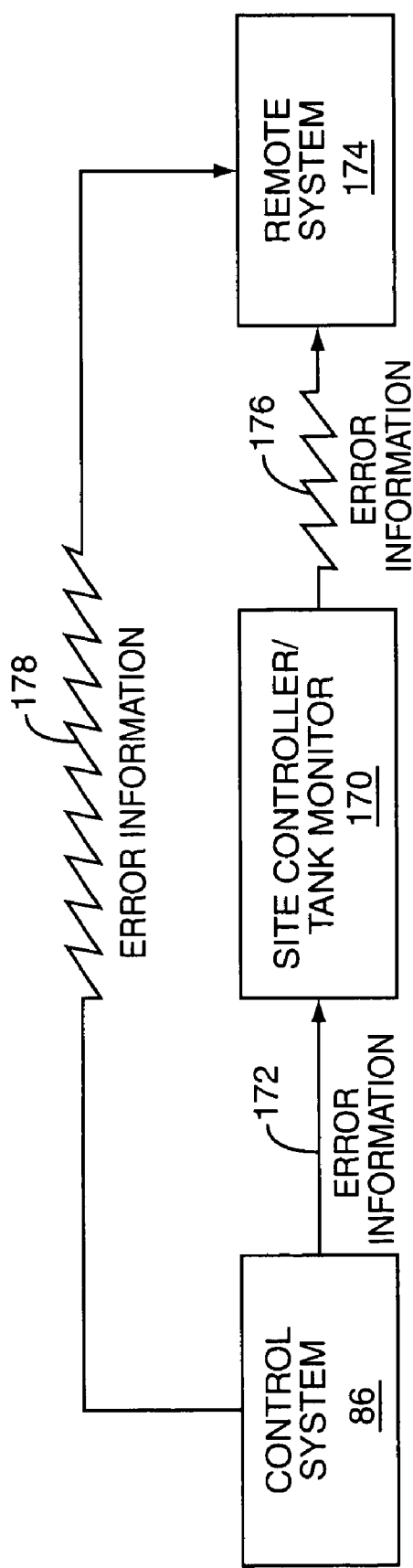
FIG. 11 illustrates a schematic diagram of an error reporting communication architecture.

FIG. 11 is a diagram of a communication architecture in which the control system 86 may communicate a meter 40/pulser 100 error or flow switch 96 error from the "ERROR" state illustrated in FIG. 10 to other system and/or personnel. As previously described, the control system 86 will detect an error if the flow switch 96 is activated indicating fuel flow, but the meter 40 is not generated pulses indicative of fuel flow meaning there is an error with the meter 40 or its pulser 100 (transition 170 in FIG. 10), or vice versa, which would mean that there is a "flow switch error" (transition 166 in FIG. 10). In either instance, whether it be a meter 40 or pulser 100 error, or a flow switch 96 error, the control system 86 may communicate this error electronically to another system to alert service and/or operational personnel and/or otherwise report the error.

The control system 86 may communicate the error information to a site controller/tank monitor 170 over a local communication line 172. The site controller/tank monitor 170 may in turn communicate such error information to a remote system 174 via a remote communication line 170 for the same purpose. The remote system 174 may be located in the same location as the site controller/tank monitor 170, or at a location located remotely from the site controller/tank monitor 170. The control system 86 may also be configured to communicate the error information directly to the remote system 174 via a remote communication line 178 rather than through an intermediate site controller/tank monitor 170. Communication lines 172, 176, 178 may be wired or wireless communication paths and may include remote transmissions or communications, including telephone line, Ethernet, and satellite.

Figure 12A:
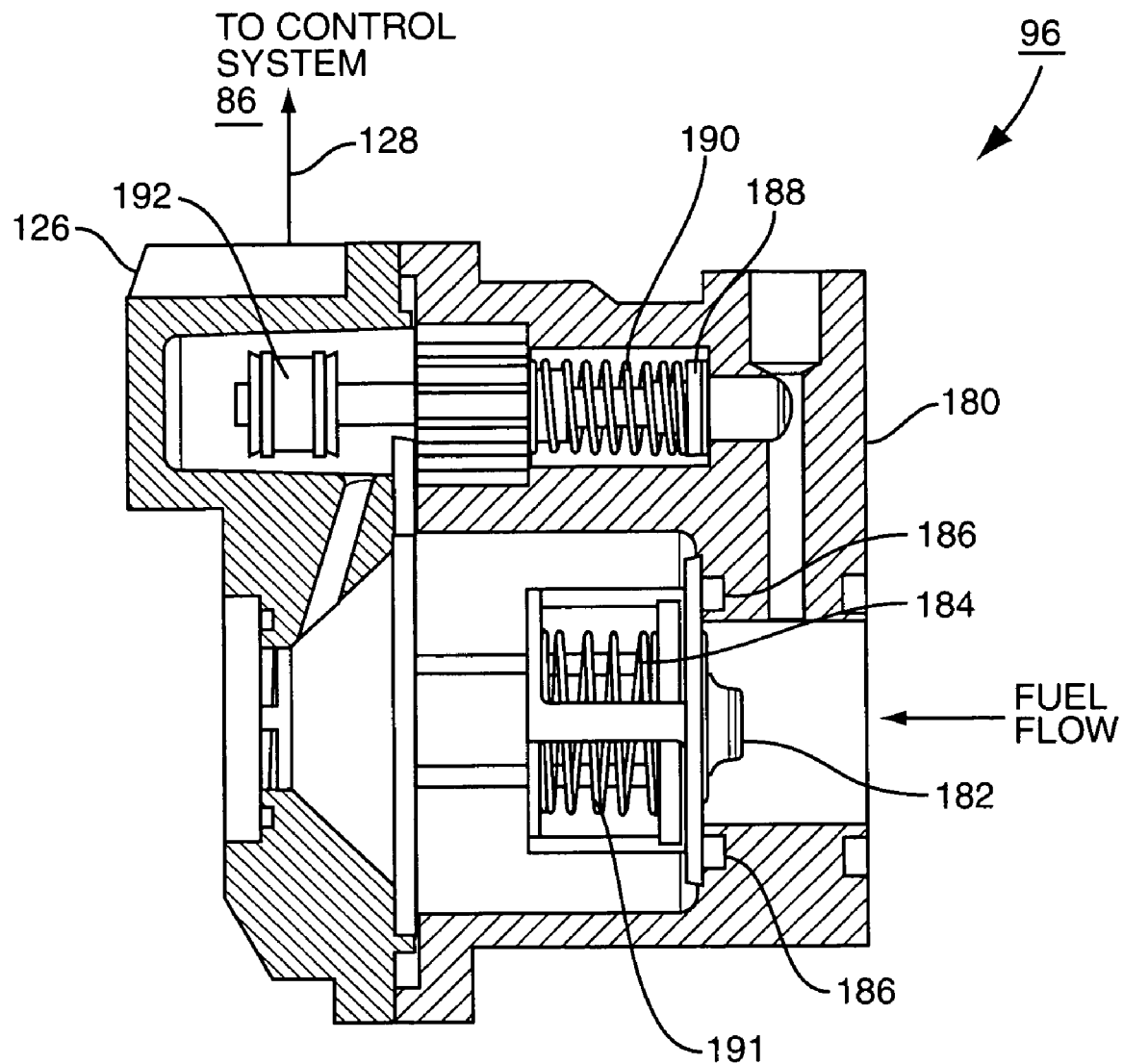
FIG. 12A illustrates a dual poppet embodiment of a flow switch in a first, closed position in accordance with another embodiment of the present invention.

FIG. 12A illustrates an alternative embodiment of a flow switch 96, which is generally referred to as a dual poppet valve and which is also described in U.S. Pat. Nos. 6,763,974 and 6,827,236 and application Ser. No. 10/819,747, all of which are incorporated by reference in their entireties. A dual poppet valve may have an increased performance capability over the single poppet valve due to slow flow and high flow conditions in a fuel dispenser 14 that also occur in a "pre-pay"/"preset" fueling transaction. A fuel dispenser 14 typically includes a two-staged high flow and slow flow valve (not illustrated) so that fuel flow can be slowed down at the end of a preset transaction when the customer has dictated a set number of gallons or price to be paid for fuel. When the slow flow condition exists, the force from the fuel flow as applied to a single poppet valve may not be enough force to move the poppet head 142 back so that the position sensible element 192 is detected by the sensor 126 such that the control system 86 detects that fuel is flowing. In this instance, fuel is flowing through the flow switch 96, but the control system 86 will not register fuel flow and will transition into "ERROR" state 168 (in FIG. 10) indicative of a flow switch 96 error. Therefore, it may be advantageous to design a flow switch 96 in the form of a dual poppet valve that is capable of operating in both high flow and slow flow conditions.

The dual poppet valve flow switch 96 according to the embodiment illustrated in FIG. 12A is in a closed position so that no fuel flows through the dual poppet valve 96. The dual poppet valve 96 includes a housing 180 that is formed from a material that does not corrode in the presence of hydrocarbons or has been treated to avoid corrosion. A primary piston 182 is positioned within the housing 180. The primary piston 182 is held in its normally closed position by a primary spring 184. An o-ring 186 may be used to help ensure a tight seal between the primary piston 182 and the housing 180.

A secondary piston 188 is likewise present. The secondary piston 188 is held in its normally closed position by a secondary spring 190. The secondary piston 188 is positioned proximate to the housing 180 of the dual poppet valve 96 and is used to sense the position of the position sensible element 192. The sensor 126 communicates with the control system 86 to indicate the position of the secondary piston 188. In an exemplary embodiment, the position sensible element 192 is a magnet and the sensor 126 is a Hall-effect sensor, like that previously described for the single poppet valve 96 illustrated in FIGS. 7–9. Alternative position sensible element 192/sensor 126 combinations include, but are not necessarily limited to: magnetic read switches, ultrasonic, in capacitive combinations.

The dual poppet valve 96 will be in the fully-closed position illustrated in FIG. 12A when no fuel is flowing. In a preferred embodiment, the force required to compress the secondary spring 190 is lower than the force required to compress the primary spring 184. Specifically, the secondary spring 190 is adapted to compress during a slow fuel flow condition, such as when the fuel dispenser 14 is operating in a slow flow mode. The primary spring 184 is adapted to compress during a high fuel flow condition, such as when the fuel dispenser 14 is operating in a high flow mode.

Figure 12B:
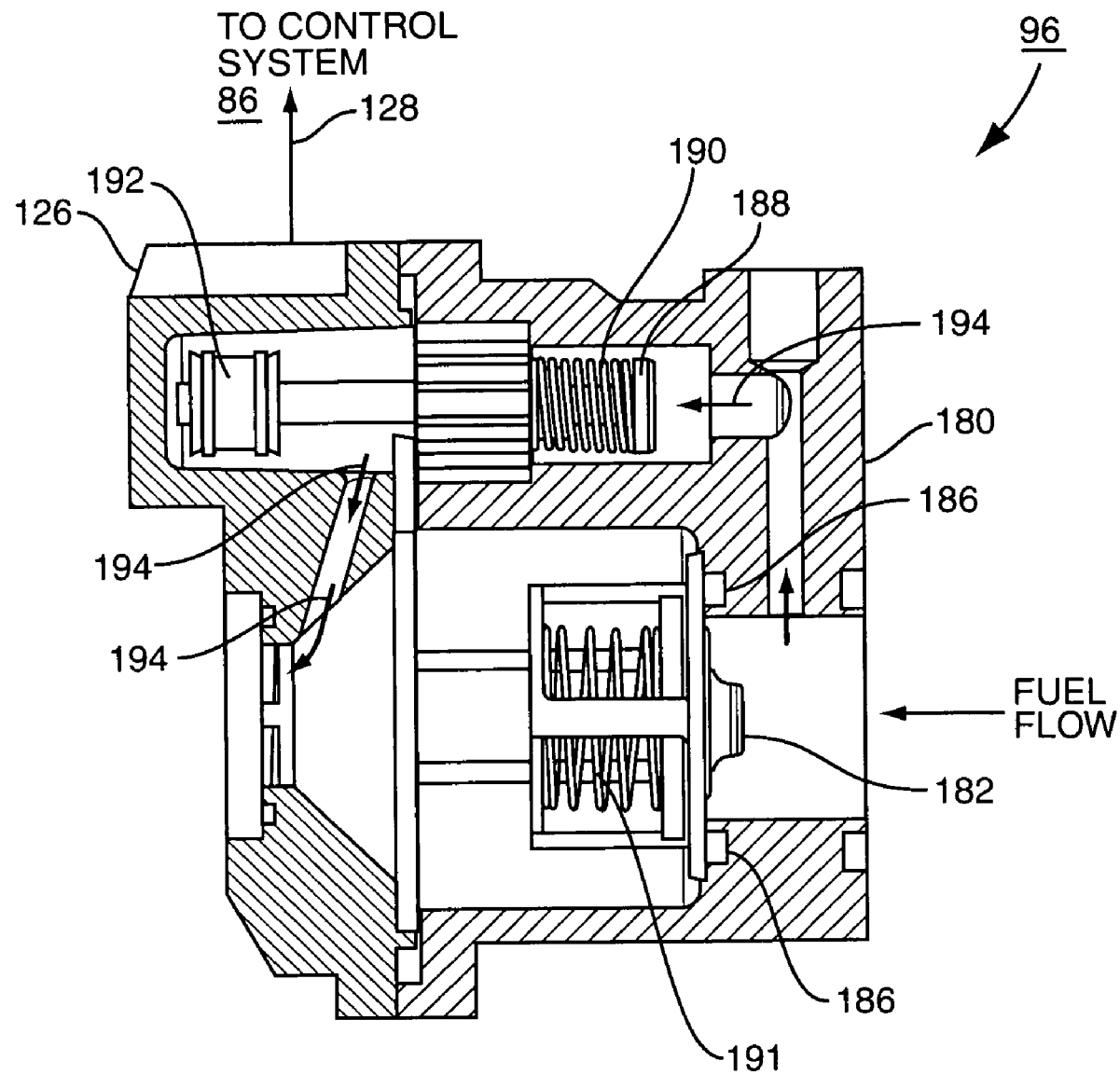
FIG. 12B illustrates the dual poppet flow switch illustrated in FIG. 11A in a second, partially open position.

The dual poppet valve 96 is illustrated in a partially open mode in FIG. 12B. As illustrated, the secondary spring 190 has compressed due to the pressure on the secondary piston 188. Compression of the secondary spring 190 opens the secondary or bypass fuel path 194 noted variously by arrows. Additionally, the movement of the secondary piston 188 that compressed the secondary spring 190 causes the position sensible element 192 to move such that the sensor 126 detects the movement and sends a signal indicative of the movement to the control system 86 via the sensor communication line 128. The control system 86, upon receipt of the signal indicating movement of the position sensible element 192, is able to acknowledge activation of the flow switch 96 to perform the state machine illustrated previously in FIG. 10.

Figure 12C:
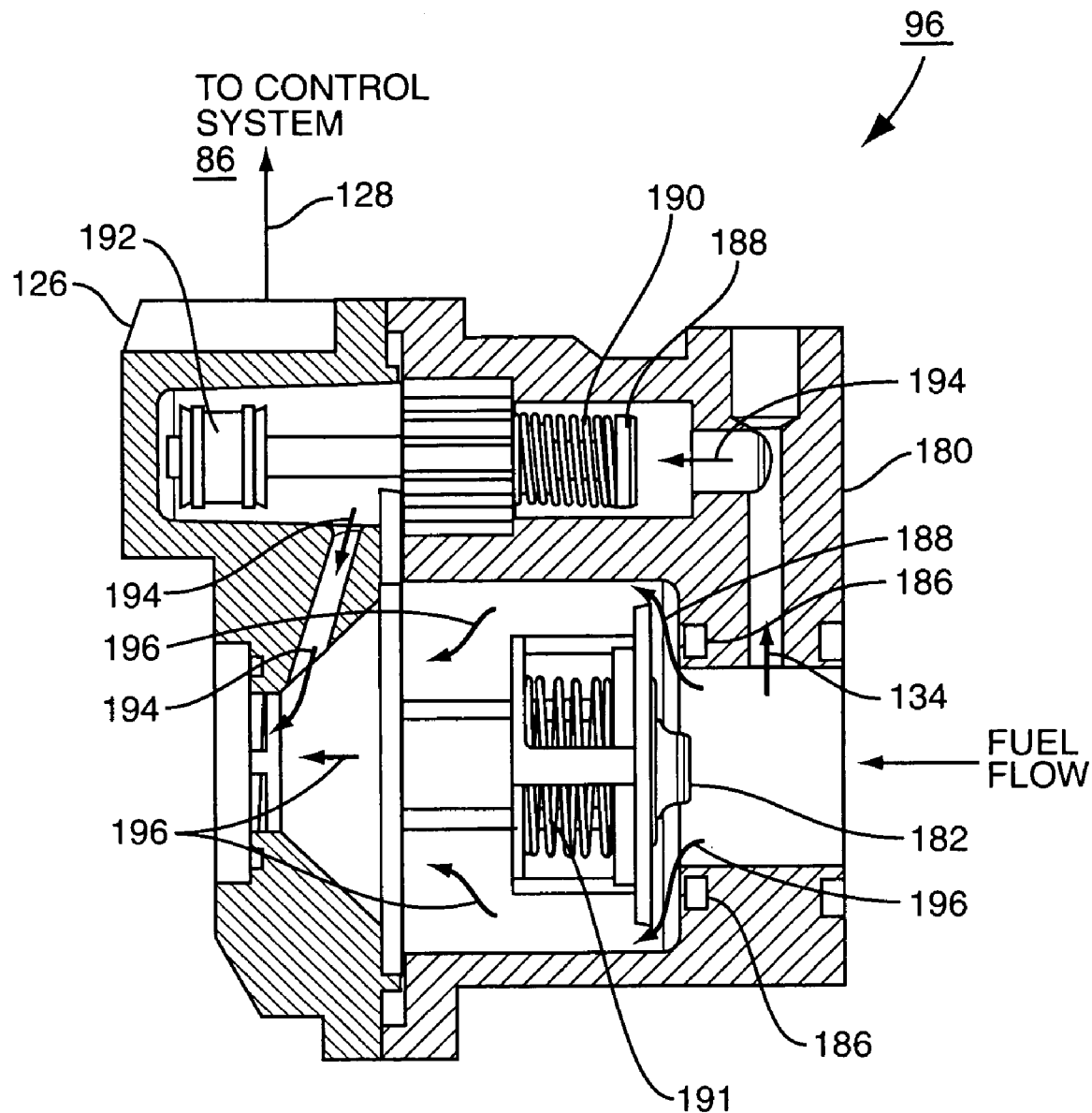
FIG. 12C illustrates the dual poppet flow switch illustrated in FIG. 11A in a third, fully open position.

The dual poppet valve 96 is illustrated in a fully open mode in FIG. 12C. When the fuel dispenser 14 is operating in a high flow mode, the fluid pressure builds up in the dual poppet valve 96 to the point where the primary spring 184 is forced to compress. This opens the primary fuel path 196 shown variously by arrows and allows fuel to flow through the fuel dispenser 14 at a high flow rate. The valve 96 also acts as a check valve to only allow fuel to flow in one direction thereby preventing backflow, which can cause turbulence and inaccuracies in fuel flow measurement.

Figure 13A:
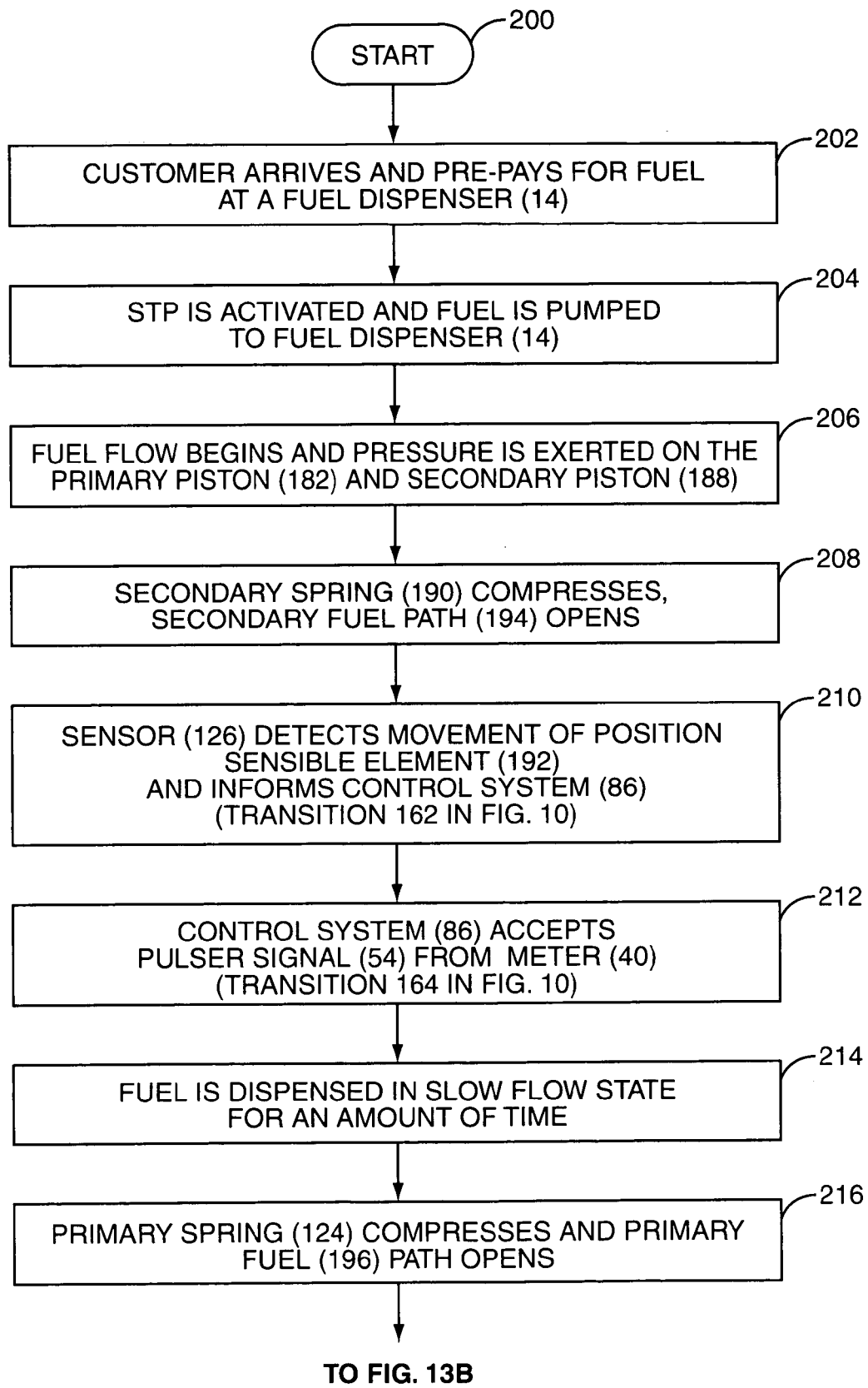
FIGS. 13A and 13B illustrate a flowchart diagram of another embodiment of the operation of the dual poppet flow switch and control system to determine the flow rate and/or volume of fuel dispensed using the flow switch illustrated in FIGS. 12A–12C.
Figure 13B:
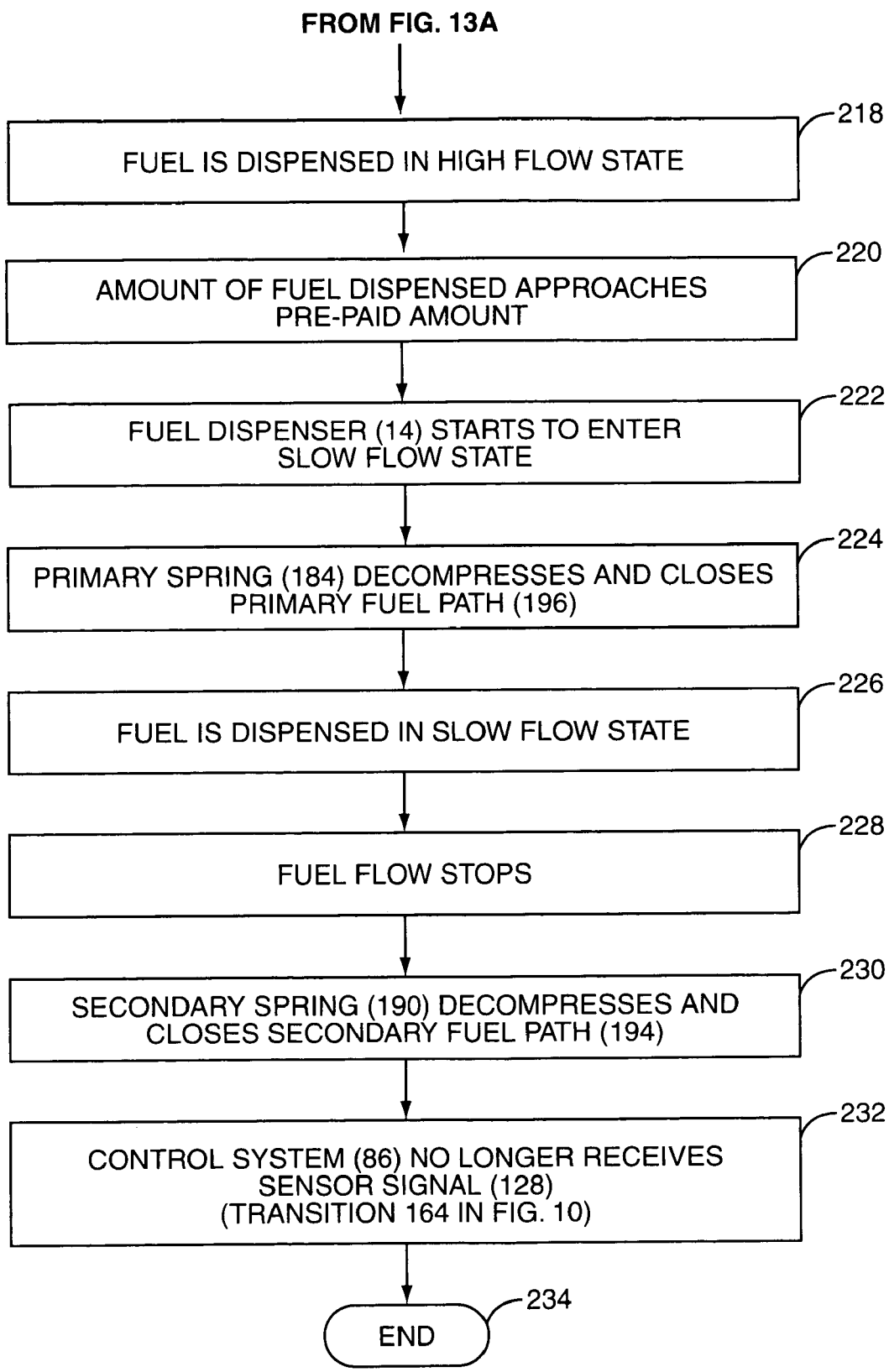

The use of the dual poppet valve 96 is also explained with reference to the flow charts in FIGS. 13A and 13B in the example of a customer "pre-pay." The process starts (block 200) and the customer arrives and prepays for fuel at a fuel dispenser 14 (block 202). The STP is activated, and fuel is pumped to the fuel dispenser 14 (block 204). When fuel flow begins flowing in response to a customer inserting the nozzle 20 into the fill neck 22 of the vehicle 12 and initiating fuel flow, fuel flow through the fuel dispenser 14 exerts pressure on the primary piston 182 and the secondary piston 188 (block 206). Next, since the amount of pressure exerted by the fuel flow is relatively low, only the secondary spring 190 compresses and the secondary fuel path 194 is opened (block 208). As the secondary fuel path 194 opens, the position sensible element 192 moves and is detected by the sensor 126, which reports the movement to the control system 86 via the sensor communication line 128 (block 210), which will cause the transition 163 illustrated in FIG. 10 to cause the control system 86 to transition to the "FLOW DETECTED" state 160. The control system 86 begins accepting the pulser signal 89 from the fuel meter 40 (block 212), which is transition 164 in FIG. 10. Fuel is then dispensed at a slow flow in the fuel dispenser 14 (block 214). Slow flow rates range typically between zero and two gallons per minute (gpm) and preferably approximately 0.25 gpm.

After a small amount of time on the order of five seconds or less, the fuel dispenser 14 enters into a high flow state. This allows more fuel to flow through the fuel dispenser 14 to the dual poppet valve 96. The volume of fuel is now great enough to exert sufficient pressure on the primary piston 182 to cause the primary spring 184 to compress, thereby opening the primary fuel path 196 (blocks 216 and 218). In due course, the amount of fuel that the fuel dispenser has dispensed will approach that paid for by the prepayment (block 220). As the transaction nears completion, the fuel dispenser 14 starts to enter a slow flow mode (block 222). For example, if the customer paid ten dollars as a prepaid amount for fuel, the fuel dispenser 14 may start to enter a slow flow state when the amount of fuel dispensed reaches nine dollars and eighty cents ($9.80), for example. This slows the amount and volume of fuel that reaches the dual poppet valve 96, thereby reducing the pressure against the primary and secondary pistons 182, 188. As the pressure has been reduced on the primary piston 182, the primary spring 184 decompresses and closes the primary fuel path 196 (block 224). Next, the fuel dispenser 14 enters the slow flow state to finalize the delivery of fuel to the vehicle 12 to equal the amount prepaid by the customer (block 226).

The customer may continue to squeeze the handle on the nozzle 20 as the final ounces of fuel are dispensed into the fuel neck 22 in slow flow state. Once the prepaid amount of fuel has been dispensed, the fuel dispenser 14 directs fuel flow to stop (block 228). This stops the flow of fuel to the dual poppet valve 96 thereby reducing the pressure on the primary and secondary pistons 182, 188. With no pressure on the secondary piston 188, the secondary spring 190 decompresses and closes the secondary fuel path 194 (block 230). The sensor 126 detects the movement of the position sensible element 192 and informs the control system 86 that fuel is no longer flowing through the flow switch 96 so that the control system 86 conducts transition 164 in FIG. 10 to return to the "NO FLOW" state 150 (block 232), and the process ends (block 234).

Note that the rotational components in a meter 40 that rotate in response to flow of fuel or liquid can be any type of component, including but not limited to spindles and turbine rotors. Also, the error that causes the meter 40 not to generate pulses could be a result of any error in the meter 40, including but not limited to lock-up of rotational components, a pulser 100 failure, or any other type of error. This patent application is not limited to any particular type of meter 40 or pulser 100 error other than the error is one that causes the meter 40 or pulser 100 not to operate properly to indicative flow of fuel or liquid or the correct amount of fuel or liquid. The timer values for the timers discussed in the state diagram executed by the control system 86 to determine if a flow switch 96 error or pulser 100 or meter 40 error occurred can be set to any value according to design and response time desired.

Those skilled in the art will recognize improvements and modifications to the preferred embodiments of the present invention. All such improvements and modifications are considered within the scope of the concepts disclosed herein and the claims that follow.

What is claimed is:

1. A fuel dispenser that measures the flow rate or volume of fuel dispensed into a vehicle, comprising:
   a control system;
   a fuel conduit that is fluidly coupled to fuel;
   a meter coupled to the fuel conduit, comprising:
      a meter flow path coupled to a hose that dispenses the fuel to the vehicle; and
      a pulser that sends a pulser signal in relation to the flow of fuel through the meter flow path to the control system; and
   a flow switch coupled to the fuel conduit, comprising:
      a flow switch flow path; and
      a sensor that communicates a flow switch signal to the control system when the fuel is passing through the flow switch flow path;
      the flow switch flow path fluidly coupled to the meter flow path such that fuel that passes through the meter flow path also passes through the flow switch flow path;
   the control system receives the pulser signal and calculates a flow rate or volume of the fuel passing through the meter flow path based on the pulser signal; and
   the control system detects a flow switch error when the pulser signal is being received and the flow switch signal is not received, or a meter error when the flow switch signal is being received and the pulser signal is not being received.

2. The fuel dispenser of claim 1, wherein the control system detects the flow switch error when the pulser signal is being received and the flow switch signal is not received within a predetermined amount of time.

3. The fuel dispenser of claim 1, wherein the control system detects the meter error when the flow switch signal is being received and the pulser signal is not received within a predetermined amount of time.

4. The fuel dispenser of claim 1, further comprising a pulser timer coupled to the control system wherein the control system starts the pulser timer when the pulser signal is received and generates the meter error if the pulser timer times out while the flow switch signal is being received.

5. The fuel dispenser of claim 1, further comprising a flow switch timer coupled to the control system wherein the control system starts the flow switch timer when the flow switch signal is received and generates the flow switch error if the flow switch timer times out while the pulser signal is being received.

6. The fuel dispenser of claim 1, further comprising a pulser timer coupled to the control system wherein the control system starts the pulser timer when the pulser signal is received.

7. The fuel dispenser of claim 6, further comprising a flow switch timer coupled to the control system wherein the control system starts the flow switch timer when the pulser signal is received.

8. The fuel dispenser of claim 7, wherein the control system restarts the pulser timer and stops the flow switch timer when the flow switch signal is received.

9. The fuel dispenser of claim 8, wherein the control system restarts the pulser timer as long as the pulser signal is continued to be received before the pulser timer times out.

10. The fuel dispenser of claim 8, wherein the control system generates the meter error if the pulser signal is not received before the pulser timer times out.

11. The fuel dispenser of claim 8, wherein the control system stops the pulser timer if the flow switch signal is not further received.

12. The fuel dispenser of claim 7, wherein the control system stops the flow switch timer if the pulser signal is not further received before the pulser timer times out.

13. The fuel dispenser of claim 7, wherein the control system generates a flow switch error if the flow switch timer times out before the flow switch signal is received.

14. The fuel dispenser of claim 1, further comprising a pulser timer coupled to the control system wherein the control system starts the pulser timer when the flow switch signal is received.

15. The fuel dispenser of claim 1, wherein the flow switch is located in a position comprised from the group consisting of upstream of the meter and downstream of the meter.

16. The fuel dispenser of claim 1, wherein the flow switch further comprises:
   a housing; and
   a primary fuel flow path positioned within the housing comprising:
      a piston; and
      a spring holding the piston in a normally closed position.

17. The fuel dispenser of claim 16, wherein the sensor is adapted to sense movement of the piston and report movement of the piston to the control system by communicating the flow switch signal to the control system.

18. The fuel dispenser of claim 17, wherein the piston further comprises a position sensible element.

19. The fuel dispenser of claim 18, wherein the position sensible element comprises a magnet and the sensor comprises a Hall-effect sensor.

20. The fuel dispenser of claim 17, wherein the sensor comprises an element selected from the group consisting of: a magnetic reed switch arrangement, a capacitive sensor, an ultrasonic sensor, and a Hall-effect sensor.

21. The fuel dispenser of claim 1, wherein the flow switch is comprised of:
   a valve body;
   a poppet head;
   an o-ring;
   a relief valve wherein the relief valve is coupled between the valve body and the o-ring and wherein the o-ring is coupled between the relief valve and the poppet head;
   a washer; and
   a spring coupled between the poppet head and the washer;
   the poppet head adapted to compress the spring towards the washer when a force is applied to the side of the poppet head coupled to the o-ring.

22. The fuel dispenser of claim 1, wherein the flow switch further comprises:
   a housing;
   a primary fuel flow path positioned within the housing comprising:
      a primary piston; and
      a primary spring holding the primary piston in a normally closed position;
   a secondary fuel flow path positioned within the housing, fluidly connected to the primary fuel flow path and passing around the primary piston, the secondary fuel flow path comprising:
      a secondary piston; and
      a secondary spring holding the secondary piston in a normally closed position, the secondary spring requiring less force to compress than the primary spring.

23. The fuel dispenser of claim 22, wherein the sensor is adapted to sense movement of the secondary piston and report movement of the secondary piston to the control system.

24. The fuel dispenser of claim 23, wherein the secondary piston further comprises a position sensible element.

25. The fuel dispenser of claim 24, wherein the position sensible element comprises a magnet and the sensor comprises a Hall-effect sensor.

26. The fuel dispenser of claim 25, wherein the sensor comprises an element selected from the group consisting of: a magnetic reed switch arrangement, a capacitive sensor, an ultrasonic sensor, and a Hall-Effect sensor.

27. The fuel dispenser of claim 1, wherein the flow switch error or meter error is communicated by the control system to a system comprised from the group consisting of a site controller, a tank monitor, and a remote system.

28. The fuel dispenser of claim 27, wherein the flow switch error or meter error is communicated by the site controller or the tank monitor to the remote system.

29. A system that measures the flow rate or volume of a fluid, comprising:
   a control system;
   a meter, comprising:
      a meter flow path coupled to the fluid conduit; and
      a pulser that sends a pulser signal in relation to the flow of fluid through the meter flow path to the control system; and
   a flow switch coupled to the fluid conduit, comprising:
      a flow switch flow path; and
      a sensor that communicates a flow switch signal to the control system when the fluid is passing through the flow switch flow path;
      the flow switch flow path fluidly coupled to the meter flow path such that fluid that passes through the meter flow path also passes through the flow switch flow path;
   the control system receives the pulser signal and calculates a flow rate or volume of the fluid passing through the meter flow path based on the pulser signal; and
   the control system detects a flow switch error when the pulser signal is being received and the flow switch signal is not received, or a meter error when the flow switch signal is being received and the pulser signal is not being received.

30. The system of claim 29, wherein the control system detects the flow switch error when the pulser signal is being received and the flow switch signal is not received within a predetermined amount of time.

31. The system of claim 29, wherein the control system detects the meter error when the flow switch signal is being received and the pulser signal is not received within a predetermined amount of time.

32. The system of claim 29, further comprising a pulser timer coupled to the control system wherein the control system starts the pulser timer when the pulser signal is received and generates the meter error if the pulser timer times out while the flow switch signal is being received.

33. The system of claim 29, further comprising a flow switch timer coupled to the control system wherein the control system starts the flow switch timer when the flow switch signal is received and generates the flow switch error if the flow switch timer times out while the pulser signal is being received.

34. The system of claim 29, wherein the flow switch error or meter error is communicated by the control system to another system.

35. A method of determining an error in a fuel dispenser that dispensed fuel to a vehicle, comprising the steps of:
   passing the fuel through the flow path of a meter;
   the meter generating a pulser signal in response to the fuel passing through the flow path of the meter when the meter is operating properly;
   passing the fuel through a flow switch fluidly coupled to the flow path;
   the flow switch generating a flow switch signal in response to fuel passing through the flow switch when the flow switch is operating properly;

determining the flow rate or volume of fuel passing through the flow path of the meter based on the pulser signal;
generating a flow switch error if the pulser signal is being received by a control system and the flow switch signal is not being received by the control system; and
generating a meter error when the flow switch signal is being received by the control system and the pulser signal is not being received by the control system.

36. The method of claim 35, further comprising detecting the flow switch error when the pulser signal is being received by the control system and the flow switch signal is not received by the control system within a predetermined amount of time.

37. The method of claim 35, further comprising detecting the meter error when the flow switch signal is being received by the control system and the pulser signal is not received by the control system within a predetermined amount of time.

38. The method of claim 35, further comprising:
starting a pulser timer coupled to the control system when the pulser signal is received by the control system; and
generating the meter error if the pulser timer times out while the flow switch signal is being received by the control system.

39. The method of claim 35, further comprising:
starting the flow switch timer coupled to the control system when the flow switch signal is received by the control system; and
generating the flow switch error if the flow switch timer times out while the pulser signal is being received by the control system.

40. The method of claim 39, further comprising the step of the control system communicating the flow switch error or meter error to a system comprised from the group consisting of a site controller, a tank monitor, and a remote system.

41. The method of claim 40, further comprising the site controller or the tank monitor communicating the flow switch error or meter error to the remote system.

42. The method of claim 39, further comprising the step of the control system communicating the flow switch error or meter error to another system.

43. The method of claim 35, further comprising starting a pulser timer coupled to the control system when the pulser signal is received by the control system.

44. The method of claim 43, further comprising starting a flow switch timer coupled to the control system when the pulser signal is received by the control system.

45. The method of claim 44, further comprising restarting the pulser timer and stopping the flow switch timer when the flow switch signal is received by the control system.

46. The method of claim 45, further comprising restarting the pulser timer as long as the pulser signal is continued by the control system to be received before the pulser timer times out.

47. The method of claim 45, further comprising generating the meter error if the pulser signal is not received by the control system before the pulser timer times out.

48. The method of claim 45, further comprising stopping the pulser timer if the flow switch signal is not further received by the control system.

49. The method of claim 44, further comprising stopping the flow switch timer if the pulser signal is not further received by the control system before the pulser timer times out.

50. The method of claim 44, further comprising generating a flow switch error if the flow switch timer times out before the flow switch signal is received by the control system.

51. The fuel dispenser of claim 35, further comprising starting a pulser timer coupled to the control system when the flow switch signal is received by the control system.

52. The method of claim 35, wherein the step of generating a flow switch signal comprises sensing the movement of a piston in a flow switch housing that moves in response to fluid passing through the flow switch housing.

53. The method of claim 52, further comprising:
sensing movement of the piston; and
reporting movement of the piston to a control system by communicating the flow switch signal to the control system.

54. The method of claim 53, wherein the step of sensing the movement of the piston comprises sensing a position sensible element on the piston.

55. The method of claim 52, further comprising releasing a relief valve in the flow switch housing if the flow switch becomes over-pressurized.

56. The method of claim 35, wherein the step of generating a flow switch signal comprises:
initiating the dispensing of fuel;
opening partially a two-stage valve adapted to regulate fuel flow into a flow rate selected from the group consisting of: no flow, slow flow and high flow;
measuring the flow rate of the fuel;
compressing a secondary spring in a secondary piston in a dual piston valve to open a secondary fuel path;
detecting movement of a sensible element in the dual piston valve when the secondary piston moves; and
communicating the movement of the secondary piston to the control system;
dispensing the fuel in a slow flow state;
opening fully the two-stage valve;
compressing a primary spring in a primary piston in the dual piston valve to open a primary fuel path; and
dispensing the fuel in a high flow state.

57. A method of determining an error in a system that measures the flow rate or volume of a fluid, comprising the steps of:
passing the fluid through the flow path of a meter;
the meter generating a pulser signal in response to the fluid passing through the flow path of the meter when the meter is operating properly;
passing the fluid through a flow switch fluidly coupled to the flow path;
the flow switch generating a flow switch signal in response to fluid passing through the flow switch when the flow switch is operating properly;
determining the flow rate or volume of the fluid passing through the flow path of the meter based on the pulser signal;
generating a flow switch error if the pulser signal is being received by a control system and the flow switch signal is not being received by the control system; and
generating a meter error when the flow switch signal is being received by the control system and the pulser signal is not being received by the control system.

58. The method of claim 57, further comprising detecting the flow switch error when the pulser signal is being received by the control system and the flow switch signal is not received by the control system within a predetermined amount of time.

59. The method of claim 57, further comprising detecting the meter error when the flow switch signal is being received by the control system and the pulser signal is not received by the control system within a predetermined amount of time.

60. The method of claim 57, further comprising:
starting a pulser timer coupled to the control system when the pulser signal is received by the control system; and
generating the meter error if the pulser timer times out while the flow switch signal is being received by the control system.

61. The method of claim 57, further comprising:
starting the flow switch timer coupled to the control system when the flow switch signal is received by the control system; and
generating the flow switch error if the flow switch timer times out while the pulser signal is being received by the control system.

* * * * *